(12) United States Patent
O'Rourke

(10) Patent No.: US 8,606,681 B2
(45) Date of Patent: Dec. 10, 2013

(54) PREDICTING THE PERFORMANCE OF A FINANCIAL INSTRUMENT

(75) Inventor: Gregory Michael O'Rourke, San Francisco, CA (US)

(73) Assignee: Ultratick, Inc., San Francisco, CA (US)

( * ) Notice: Subject to any disclaimer, the term of this patent is extended or adjusted under 35 U.S.C. 154(b) by 321 days.

(21) Appl. No.: 13/188,901

(22) Filed: Jul. 22, 2011

(65) Prior Publication Data

US 2012/0226645 A1    Sep. 6, 2012

Related U.S. Application Data

(60) Provisional application No. 61/449,114, filed on Mar. 4, 2011.

(51) Int. Cl.
*G06Q 10/00* (2012.01)

(52) U.S. Cl.
USPC ............................................. 705/36 R

(58) Field of Classification Search
USPC ................................. 705/36, 36 R
See application file for complete search history.

(56) References Cited

U.S. PATENT DOCUMENTS

2002/0013756 A1 * 1/2002 Piccioli ................... 705/36

OTHER PUBLICATIONS

Chenoweth et al., "Technical Trading Rules as a Prior Knowledge to a Neutral Networks Predication System for the S&P 500 Index," Mar. 2005.*

* cited by examiner

*Primary Examiner* — Samica L Norman
(74) *Attorney, Agent, or Firm* — King & Spalding LLP; Sanjeet Dutta

(57) ABSTRACT

Systems and methods are disclosed for predicting the performance of a financial instrument by extracting influential features and emotional sentiment data from received data values, common features, and internet sources, each corresponding to a financial instrument, building multiple predictive models using random selections of the data values and combining the predictive models to create a combined prediction model. The combined prediction model provides a combined predicted data value where the combined predicted data value is a performance indicator, such as a classification count or percentage, of data values that correspond to the financial instrument and classify correctly via the prediction models. Further, the combined prediction model may be iterated over new or test data values to constantly select the most influential common features to build new prediction models and a resulting new combined prediction model for reducing a classification predictive error and updating the combined predicted data value.

30 Claims, 16 Drawing Sheets

PREDICTING THE PERFORMANCE OF A FINANCIAL INSTRUMENT

CROSS-REFERENCE TO RELATED APPLICATIONS

The present disclosure claims priority to Provisional Application No. 61/449,114, titled SYSTEM AND METHOD FOR PREDICTING SECURITY PERFORMANCE USING HYBRIDIZATION OF RESULTS FROM MULTIPLE PREDICTABILITY MODELS AND ADAPTIVE LEARNING, filed Mar. 4, 2011, which is hereby incorporated herein by reference.

TECHNICAL FIELD

The present disclosure relates to a system and method for predicting the performance of a financial instrument from received data values and their common features, each corresponding to the financial instrument.

BACKGROUND

Trading platforms and financial instrument current prediction software provide predictive analyses of individual financial instruments or a group of similarly targeted financial instruments based on current valuation and/or performance of the particular financial instrument or its group. Further, such software may also provide prediction for varying time periods from the analysis of current and historic financial data values, where the data values are gathered over several different time periods.

However, it is common that such current prediction software is unable to follow inconsistent changes in the market environment. Specifically, the software may rely on single patterns or single features in the market fluctuations, but may not adapt to irregular fluctuations that are not typical in regular market cycles. By way of an example, current prediction software may only focus on closing prices for a stock and may ignore sudden and unexpected trading volumes. This approach only looks at part of the available information. An unexpected pattern in the closing price for a stock may reflect an existing pattern, such as the release of financial information by the company that issued the stock. This is an expected event, against, for example, a mid-day news release related to the company, that may cause high volume transaction unrelated to the financial information. The closing value may, therefore, mask the influence of other features/attributes of the stock. The unexpected trading volumes may not reflect entirely on stock performance until some time has elapsed, therefore rendering an automated analysis irrelevant until after the opportunity has passed.

In another example, known prediction software uses a single feature of a financial instrument for prediction purposes. The single feature may be the closing price alone or the volume of trade alone. Further, the prediction software may use a single prediction model, such as, a hidden markov model (HMM) or a clustering model to predict future valuations of the financial instrument from current valuations or volumes. However, single prediction models are not accurate and do not track multiple feature changes effectively.

Accordingly, there is a need for a process that is able to identify stock value changes, with high confidence, hours to days in advance of the changes.

SUMMARY

The system and method described herein attempt to overcome the drawbacks discussed above by extracting influential features from received data values and underlying common features, both associated with a financial instrument; building multiple predictive models using random selections of the data values; and combining the predictive models to provide a combined predicted data value, where the combined predicted data value is a performance indicator of the financial instrument, and may be used to facilitate purchase or sale of at least one unit of a financial instrument (e.g., stock).

In one exemplary embodiment, a method for predicting financial instrument performance includes receiving, by a computer, data values corresponding to a financial instrument, the data values including a plurality of common features; extracting, by the computer, using at least a first prediction model, more than one first common feature from the received plurality of common features and a corresponding dependence value for each of the extracted first common features, each of the extracted first common features being an influential feature; building, by the computer, a plurality of second prediction models, each of the second prediction models corresponding to each of the extracted influential features and each of the second prediction models using a first random selection of the received data values corresponding to each of the extracted influential features to generate predicted data values corresponding to the financial instrument for each extracted influential feature; and combining, by the computer, each of the second prediction models in a series arrangement, where the predicted data values corresponding to one second prediction model is input to another second prediction model until all the second prediction models are involved, thereby creating a combined prediction model, and where the combined prediction model uses the dependence value identified in the first prediction model as a weighing value for each predicted data value from each second prediction model, and the combined prediction model generates a combined predicted data value corresponding to the financial instrument.

In another exemplary embodiment, the method for predicting financial instrument performance further includes computing, by the computer, a predictive error from the predicted data values of each of the second prediction models and the combined prediction model, the predictive error computed using a second random selection of received data values to test each of the second prediction models and the combined prediction model; and iterating, by the computer, the extracting step to create a new first common feature, the building step to build a plurality of new second prediction models, and the combining step to combine each of the new second prediction models using the computed predictive error for each of the second prediction models and the combined prediction model, thereby incorporating the predictive error to each of the second prediction models and the combined prediction model for reducing the predictive error and updating the combined predicted data value corresponding to the financial instrument.

In yet another exemplary embodiment, a system for predicting financial instrument performance includes a computer for receiving data values corresponding to a financial instrument, the data values including a plurality of common features; the computer for extracting, using at least a first prediction model, more than one first common feature from the received plurality of common features and a corresponding dependence value for each of the extracted first common features, each of the extracted first common features being an influential feature; the computer for building a plurality of second prediction models, each of the second prediction models corresponding to each of the extracted influential features and each of the second prediction models using a first random selection of the received data values corresponding to each of the extracted influential features to generate predicted data values corresponding to the financial instrument for each extracted influential feature; and the computer for combining each of the second prediction models in a series arrangement, where the predicted data values corresponding to one second prediction model is input to another second prediction model until all the second prediction models are involved, thereby creating a combined prediction model, and where the combined prediction model uses the dependence value identified in the first prediction model as a weighing value for each predicted data value from each second prediction model, and the combined prediction model generates a combined predicted data value corresponding to the financial instrument.

In yet another exemplary embodiment, the building part of the system for predicting financial instrument performance includes the computer for retrieving, the first random selection of the received data values corresponding to the financial instrument; the computer for separating, the first random selection of the received data values according to more than one different time period and according to its common features, where, when the common features overlap for the first random selection of the received data values, the separating part of the system provides replicate data values for each of the separated common features; the computer for computing, the performance of the separated data values across different time periods for each of the plurality of the second prediction models using the separated first random selection of the received data values; and the computer for selecting, from each of the plurality of second prediction models, only those second prediction models that present a threshold correlation between the separated data values across different time periods.

In yet another exemplary embodiment, the receiving step, by the computer, described above, further includes receiving emotional sentiment data corresponding to the financial instrument from computer-based sources on the internet; the extracting step, by the computer, further comprises extracting textual information from the emotional sentiment data from computer-based sources on the internet; and the building step, by the computer, further comprises assigning a numerical score to the financial instrument corresponding to the positive and negative emotional words extracted from the textual information, wherein the numerical score is a product of a numerical value attached to each positive and negative emotional word, and numerical weights associated with performance of the industry associated with the financial instrument; and the combination step, by the computer, further comprises weighing each second prediction model in the series arrangement by the numerical score.

In yet another exemplary embodiment, the system further includes a computer for receiving, receives emotional sentiment data corresponding to the financial instrument from computer-based sources on the internet; the computer for extracting, extracts textual information from the emotional sentiment data from computer-based sources on the internet; the computer for building, assigns a numerical score to the financial instrument corresponding to the positive and negative emotional words extracted from the textual information, wherein the numerical score is a product of a numerical value attached to each positive and negative emotional word, and numerical weights associated with performance of the industry associated with the financial instrument; and the computer for combining, weighs each second prediction model in the series arrangement by the numerical score.

BRIEF DESCRIPTION OF THE DRAWINGS

The accompanying drawings constitute a part of this specification and together with the specification, illustrate certain exemplary embodiments of this disclosure.

DETAILED DESCRIPTION

Reference will now be made in detail to the preferred embodiments, examples of which are illustrated in the accompanying drawings.

The system and method disclosed herein provide predicted data values corresponding to the performance for a financial instrument using combined prediction models built to analyze received data values corresponding to the financial instrument. The term financial instruments, as used herein, includes various private and public financial securities, including, but not limited to, banknotes, bonds, debentures, equity securities, structured finance securities, common stocks, derivatives-forwards, futures, options, swaps, and other finance related tradable physical or virtual entities. These financial instruments may be issued by companies and government entities, and may be traded via domestic and international exchange markets, e.g., NASDAQ®, NYSE®, and Tokyo Stock Exchange® (TSE). Each of these stock exchanges may provide online resources, including information related to current and historic valuations, performance, volumes, and related information corresponding to the respective financial instruments being traded via each stock exchange.

In an exemplary embodiment, prediction models that may be used with this disclosure include one or more of a time series prediction models, stochastic prediction models, statistical prediction models, clustering prediction models, and general economic prediction models. Further, by way of an example, the time series prediction model may include an auto-regressive (AR) prediction model, a moving average (MA) prediction model, an auto-regressive integrated moving average (ARIMA) prediction model, a vector auto-regressive (VAR) prediction model, an auto-regressive conditional heteroskedastic (ARCH) prediction model, a generalized auto-regressive conditional heteroskedastic (GARCH) prediction model, a recurrent artificial neural network (ANN) prediction model, a hybrid time series prediction model, a fractal time series prediction model, an exponential smoothing model, a Kalman filtering model, and a regime switching prediction model; the stochastic and the statistical prediction models may include a hidden markov model (HMM), a wavelet prediction model, and a jump diffusion prediction model; the clustering prediction model may include a k-nearest neighbor (KNN) prediction model, a support vector model (SVM), an expectation maximization (EM) model, a classification and regression trees (CART) model, and a multivariate adaptive regression splines (MARS) model; and the general economic prediction model includes a Bayesian network prediction model and a macroeconomic model.

Figure 1:
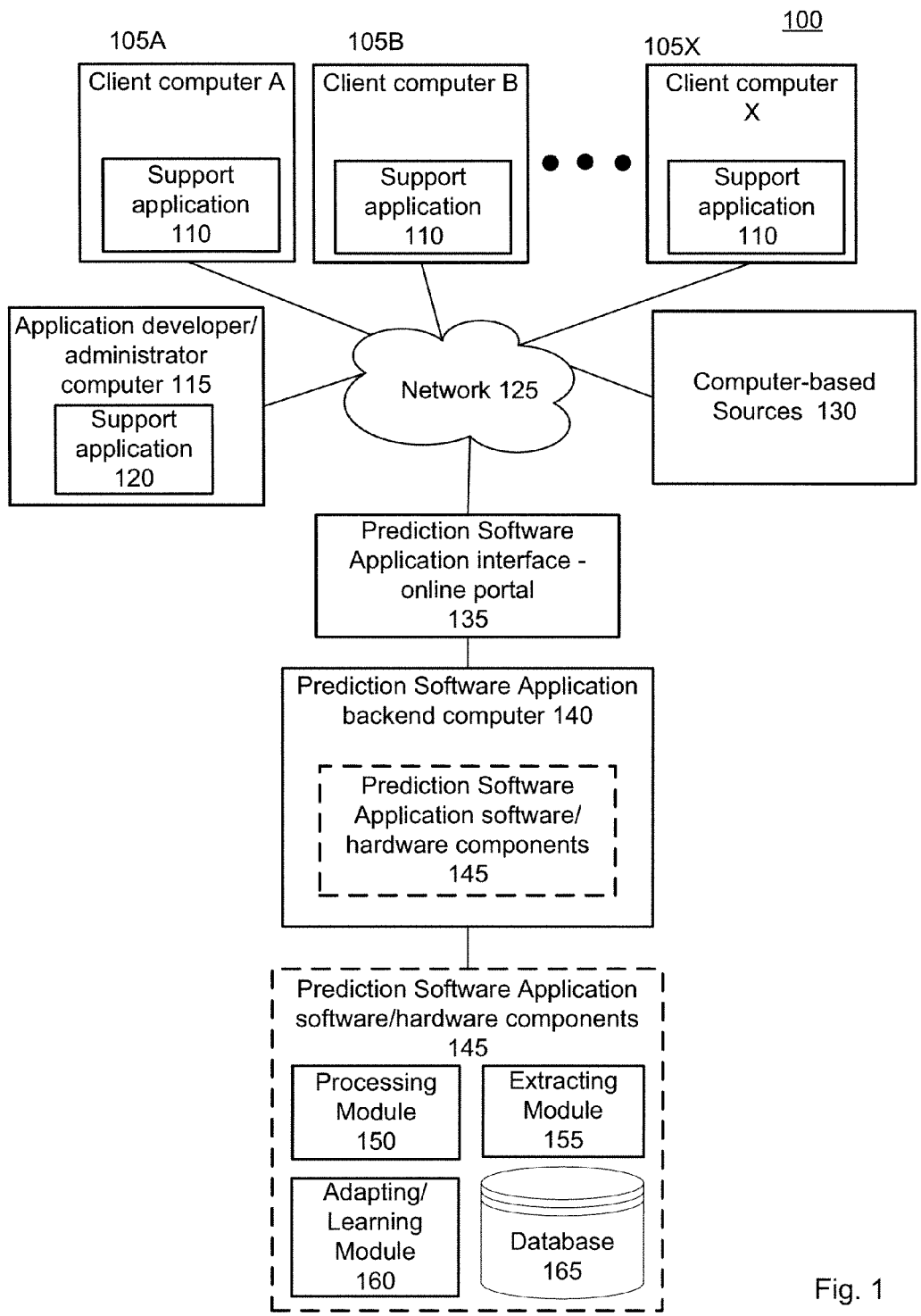
FIG. 1 illustrates a system for predicting financial instrument performance in accordance with an exemplary embodiment.

FIG. 1 illustrates a system 100 for predicting financial instrument performance in accordance with an exemplary embodiment. The system 100 may implement each of these prediction models based on common features corresponding to the received data values for the financial instrument. The common features in this disclosure refer to attributes or features of the data values that relate the data value to the financial instrument, where system 100 uses the data values and the common features to identify influential features, and predict data values for the financial instrument over varying future periods of time. In an exemplary embodiment, for a number of received data values, its common features may include closing price value of the financial instrument for a pre-defined time period; change in price values of the financial instrument over a pre-defined time period; highest value of the financial instrument over a pre-defined time period; spread value of the financial instrument at a pre-defined time period; volume of the financial instrument traded over a pre-defined time period; opening price value of the financial instrument for a pre-defined time period; and sector of the financial instrument, wherein the sector name is assigned a numerical value, where, by way of an example, the numerical value is a Standard Industrial Classification (SIC) number or a North American Industry Classification System (NAICS) number.

In one example, data values for a financial instrument, e.g., a stock, may include the closing price value of the stock for each day of a week for a full week. The common feature associated with the data value is the closing price value and this series of price values are used in conjunction with other received data values associated with the same stock to predict future price values for the stock. The pre-defined time period may include hours, days, weeks, or even months, prior to the implementation of the system 100 for predicting data values for the performance of a financial instrument. The performance corresponding to the financial instrument may be a measure of the classification of one or more of the common features in a combined prediction model built for the financial instrument.

The system 100 includes multiple computers for performing various functions associated with predicting the valuation of financial instruments. A prediction software application may include hardware and software components 145 that perform the role of a prediction software engine (also referred to as the "prediction software analysis engine"), and may function within a backend computer 140 or multiple related backend computers, where each computer performs a specific role for the prediction software engine. An administrator or developer of the prediction software application may interact with the software application via the hardware and software components 145. The administrator may use a remote frontend computer, shown as the application developer/administrator computer 115. The administrator may use a support application 120 to access the prediction software application interface 135, where the support application can be a browser or a stand-alone web-enabled software application. Client computers 105A-X may include similar stand-alone applications without an administrator-level access to the prediction software application 140, via a client interface, illustrated as the prediction software application interface 135. The application interface 135 may be an online portal, such as a website or a file transfer protocol (FTP) source on the network 125, the network being the internet, local area network, or any other network, that is accessible via wired or wireless media, including mobile wireless networks, Bluetooth® and WiFi®. The stand-alone software application version of the software application 120 may access the online portal 135 via an internet protocol (IP) address of the prediction software application backend computer 140, where the IP address access the backend computer 140 via the FTP source.

The prediction software application includes software components 145 on the backend computer 140, which may include multiple software modules 150-160. The software modules 150-160 perform various functions of the prediction software application, including receiving data values corresponding to current or historic performances of one or more financial instruments, the data values received from various computer-based sources 130; extracting common features from the received data values; building multiple prediction models corresponding to the received data values and the underlying common features; combining the prediction models to create a combined prediction model; and generating a combined predicted data value from the combined prediction model for the financial instrument. The computer-based sources 130 include financial resources, such as, financial websites, financial indices, trading platforms, economic indicators, bank rates, gold rates, real-time stock feeds, news portals, stock monitoring websites, stock exchange websites and other related resources. An administrator on computer 115 may access the prediction software application interface 135 to update software components 150-160 of the backend computer 140.

Extracting module 155 performs the extracting functions of the prediction software application 145, by identifying the influential features among the common features underlying the received data values for a financial instrument. The extracting module 155 may also generate a dependence value associated with the prediction model used. Processing module 150 analyzes the received data values and the extracted influential features to build a number of prediction models, each prediction model corresponding to an extracted influential feature and using a random selection of received data values associated with the extracted influential feature to train the prediction model. As part of the building function, the trained prediction model may then generate predicted data values using the remainder of the received data values as test data.

In an exemplary embodiment, the predicted data value is a performance indicator, such as a classification percentage of the number of received data values of the financial instrument that classify perfectly via the trained prediction model. Further, in an example of influential features, those common features that classify above 50% correctly may be considered as influential features. In another example for extracting influential features, the top two common features from a conditional independence test may be utilized as the influential features. The conditional independence test is described in detail below. The classification, based on the common feature, may indicate that the stock is expected to see a positive (or negative) change in a future time period, e.g., within the next day, week, or months. In an exemplary embodiment, the data values used to generate the predicted data values may be historic price values for the selected financial instrument. Further, the historic price values of the financial instrument may be price values collected over varying time periods, including hours, days, weeks, or even months, prior to the implementation of the system 100 for predicting data values.

In an exemplary embodiment, the extracting module 155 may extract the influential features from the received data values using a first random selection of received data values, including all the common features, in a prediction model to generate predicted data values indicative of the performance of the financial instrument. The extracting module may include a conditional independence test and at least one prediction model including a classification and regression tree (CART) model, a multivariate adaptive regression splines (MARS) model, or a random forests model. The CART, MARS, or random forests model are prediction models capable of classification and extraction of influential features. Each of these prediction models may be trained using a first random selection of the received data values, including all common features, as discussed above. A tree is created for the selected prediction model, with multiple branches, where each branch uses a further random selection from the first random selection of the data values to train, and later test, the prediction model. Each of the common features in the prediction model is permutated first to find a nominal arrangement of the common features. The exemplary use of these specific prediction models generates influential features by testing the trained prediction models using a second random selection of the received data values, where the second random selection may include overlapping data values from the first random selection of the received data values.

In an exemplary embodiment, the exemplary prediction models in the extracting module generate a variable importance plot, as a result of a testing part of the extracting process, where the variable importance plot identifies influential features. When the prediction model is used over multiple common features to create trees of data, then the average classification error over all the trees in the prediction model is computed and plotted against each of the common features. The variable importance plot is a count measurement of the number of correctly classified data values among the received data values, over each branch of the prediction model. The data values and the model description herein allows the prediction software to choose from the CART, MARS, and random forests model to classify the received data values according to the common features disclosed herein. In another exemplary embodiment, partial independence values are generated for each of the influential features identified by the variable importance plots. The partial independence values may offer weighing values from a scale of 0 to 1 for each influential feature.

The processing module 150 may select prediction models according to the influential features and the related data values. The selected prediction models may include more than one of the prediction models discussed above. The processing module may train each of the selected prediction model with random selection of the received data values to generate model-specific predicted data values. The selected prediction models may then be combined to use the predicted data values as a combined prediction model, where each prediction model can be assigned their respective dependence value as a weighing factor. In an exemplary embodiment, the combined prediction model is a series arrangement of each of the selected prediction models, where the results from one prediction model is input to another prediction model until all the selected prediction models are involved. In an exemplary embodiment, the selected prediction models are implemented as tree branches to a single combined prediction model, where each tree branch includes the weighing dependence value to weigh an error between the trained prediction model of the branch and test data values that are applied to the branch model.

The combined prediction model incorporates the predicted data values, the associated influential features associated with each independent prediction model, and the dependence value generated for each prediction model. The processing module 150 may use the dependence values generated from the feature extraction module to weigh each of the independent prediction models in accordance to the dependence of the influential feature on their respective prediction models. In an exemplary embodiment, the combined predicted data value is a performance indicator of the financial instrument, and may be used to purchase a unit of the financial instrument with an indication that a positive change is expected in future time periods for the value of the financial instrument. Similarly, if the expected change is null or negative, this information may be an indicator that an owner should hold or sell the unit(s) (e.g., stock).

In an exemplary embodiment, the combining function of the prediction software application includes a smoothing function using K-fold cross-validation and bagging (or bootstrap aggregation), with multiple sub-samples from the received data values to identify robust influential features and to prevent over-fitting during the training phase. Exemplary smoothing functions that may be applied include loess and kernel smoothers and radial basis function.

The adapting/learning module 160 performs learning functions for the independent and/or combined prediction models. In an exemplary embodiment, the learning module performs a computing function at the backend computer 140. The computing function computes a predictive error from the predicted data values of each of the second prediction models and the combined prediction model. Further, the learning module 160 computes the predictive error using a random selection of received data values to test each of the built prediction models and the combined prediction model. A predictive error may be the error in classifying the test data values against the trained prediction models. The learning module 160 may then iterate the steps used to create the first combined prediction model, including the extracting step discussed above with respect to the extracting module 155 to create a new first common feature; the building step of the processing module 150 to build a plurality of new second prediction models; and the combining step of the processing module 150 to combine each of the new second prediction models using the computed predictive error for each of the second prediction models and the combined prediction model. The learning module 160 may, therefore, incorporate the predictive error to each respective second prediction models and the combined prediction model, thereby reducing the predictive error in the next iteration, and for updating the combined predicted data value corresponding to the financial instrument.

The database 165 stores the received data values and the corresponding calculations made for the independent predicted values and the combined predicted value for one of a series of time periods. This prediction software application 145 may use this stored information to improve the robustness of the prediction system 100 for future financial instruments. In an exemplary embodiment, the system 100 includes a multi-tier hardware model to support specific functions of the various modules 150-160 of the prediction software application hardware/software components 145. In one example, the system 100 includes a database server, optimized for database functions, therefore, storing the database 165. The prediction software application interface online portal may reside on a web-tier server optimized for providing the client computers 105A-X with an optimized web-based interface. Further, the software functions for the prediction software engine may be implemented via C/C++, Matlab, and R, while the software functions for the web-based software application interface may be implemented via JavaJHTML5.

In an exemplary embodiment, the prediction software application may be available as application programming interface (API) function calls for third-party software applications, where the third-party software applications may embed certain computer codes to enable the end users of the third-party software application to access the prediction software application. By way of an example, existing stock trading websites may register with the prediction software application to use APIs from the prediction software, where the embedded API in the third-party application accesses the backend modules 150-160 and database 165 to provide performance evaluations to the end user. A smart phone application is another example of a third-party application that may use APIs to access the prediction software via the third-party application. In an exemplary embodiment, the APIs may be available in the form of XML feeds, or another computer code for client side and/or server side scripting.

Figure 2:
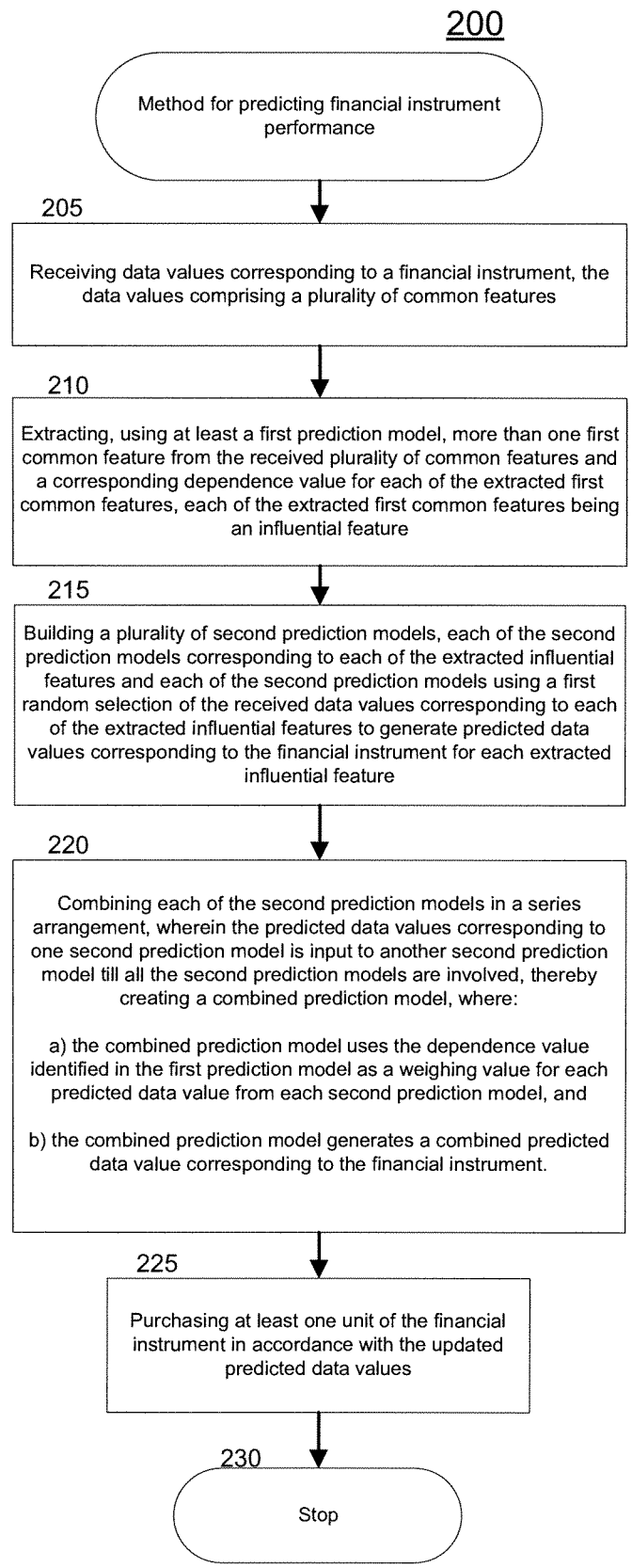
FIG. 2 illustrates a method for predicting financial instrument performance in accordance with an exemplary embodiment.

FIG. 2 illustrates a method 200 for predicting financial instrument performance in accordance with an exemplary embodiment. A prediction software application receives data values, via block 205, where each received data value corresponds to a financial instrument on the backend computer. The received data values include a plurality of common features as discussed above with respect to FIG. 1. Block 210 of the prediction software proceeds to extract more than one first common feature from the received common features using at least a first prediction model. Each of the extracted first common features may be an influential feature for the financial instrument. A corresponding dependence value for each of the extracted first common features is also extracted at this stage. In an exemplary embodiment, the extracted influential features are at least two of the highest ranking common features on the variable importance plot generated by the first prediction model, where the first prediction model is capable of feature selection.

A building step, via block 215, follows the extracting step, using the same first prediction model to build a prediction/learning tree, where each branch of the prediction tree relates to a specific influential feature or a different prediction model, different from the first prediction model. The prediction software application applies a plurality of second prediction models, different from the first prediction model, where each of the second prediction models correspond to each of the extracted influential features and each of the second prediction models uses a different first random selection of the received data values corresponding to each of the extracted influential features. Each of the second prediction models may generate predicted data values corresponding to the financial instrument for each extracted influential feature.

Block 220 of the prediction software performs a combining step, thereby effectively combining each of the second prediction models of the building step in block 215 to create a combined prediction model. The combined prediction model uses the dependence value identified in the first prediction models as a weighing value for each predicted data value from each second prediction model, where the combined prediction model generates a combined predicted data value corresponding to the financial instrument. In an exemplary embodiment, the combined prediction model is a series arrangement of each of the selected prediction models, where the results from one prediction model is input to another prediction model until all the selected prediction models are involved. The combined predicted value may be in the form of a range of combined predicted values over different future time periods. The combined predicted value may be used to purchase at least one unit of the financial instrument. The prediction software application may perform such a purchase per the software's end-user's instruction, using block 225 of the prediction software application. Block 230 concludes method 200 for predicting financial instrument performance in accordance with an exemplary embodiment.

Figure 3:
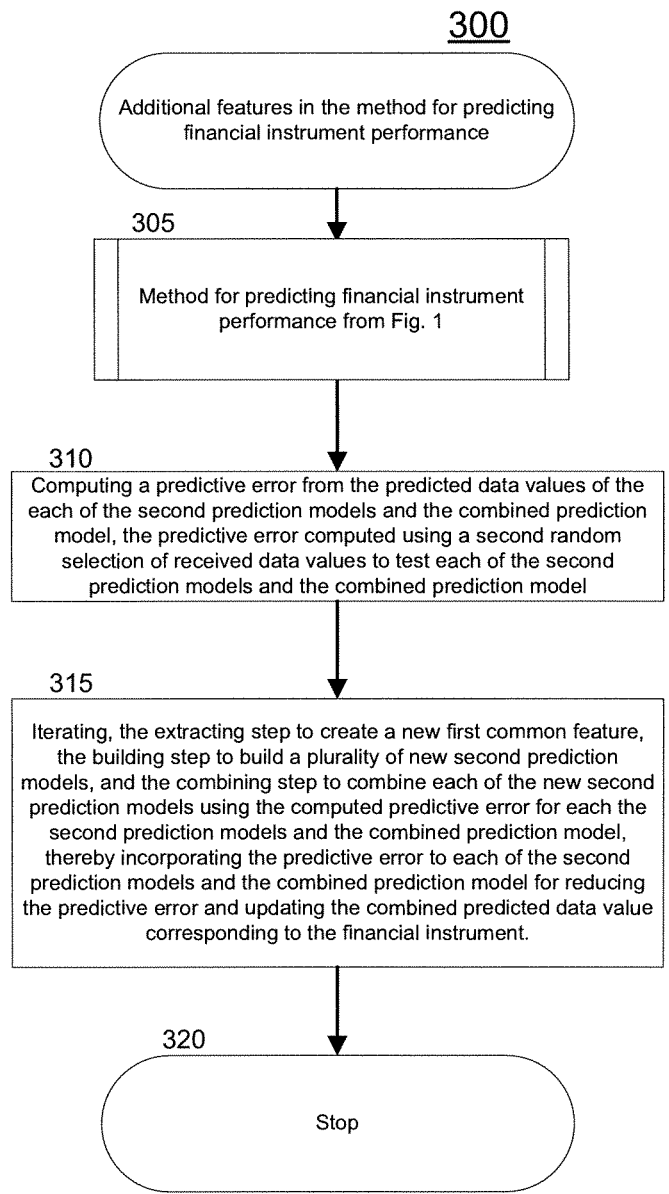
FIG. 3 illustrates additional features in the method for predicting financial instrument performance in accordance with an exemplary embodiment.

FIG. 3 illustrates additional features in a method 300 for predicting financial instrument performance in accordance with an exemplary embodiment. Specifically, FIG. 3 illustrates a feedback/feedforward method for updating the combined predicted value from block 220 of the prediction software. Block 305 refers to the method 200 for predicting financial instrument performance in accordance with an exemplary embodiment, where any data generated from the blocks in FIG. 2, in accordance with the method 200, is made available to block 310 and 315 of FIG. 3. Block 310 of FIG. 3 is a computing step of the software application, for computing a predictive error from the predicted data values of the each of the second prediction models and the combined prediction model of FIG. 2. The predictive error is computed using a second random selection of received data values, different from the first random selection of the received data values from step 215. The random selections may include repetition and need not have exclusive data values. Block 310 uses the second random selection of received data values to test each of the second prediction models and the combined prediction model.

The prediction software performs an iterating step via block 315. The iterating step in block 315 iterates the extracting step to create a new first common feature, the building step to build a plurality of new second prediction models, and the combining step to combine each of the new second prediction models using the computed predictive error for each of the second prediction models and the combined prediction model, thereby incorporating the predictive error of block 310 to each respective second prediction models and the combined prediction model. This iteration step reduces the predictive error for successive iterations, and updates the combined predicted data value corresponding to the financial instrument. Since the predictive error is reduced, higher classification in the data values results from the iteration step, where a higher classification is a predicted data value indicating good future performance related to the common feature (influential feature) being analyzed by the prediction model. Block 320 concludes the additional features in a method 300 for predicting financial instrument performance in accordance with an exemplary embodiment.

Figure 4:
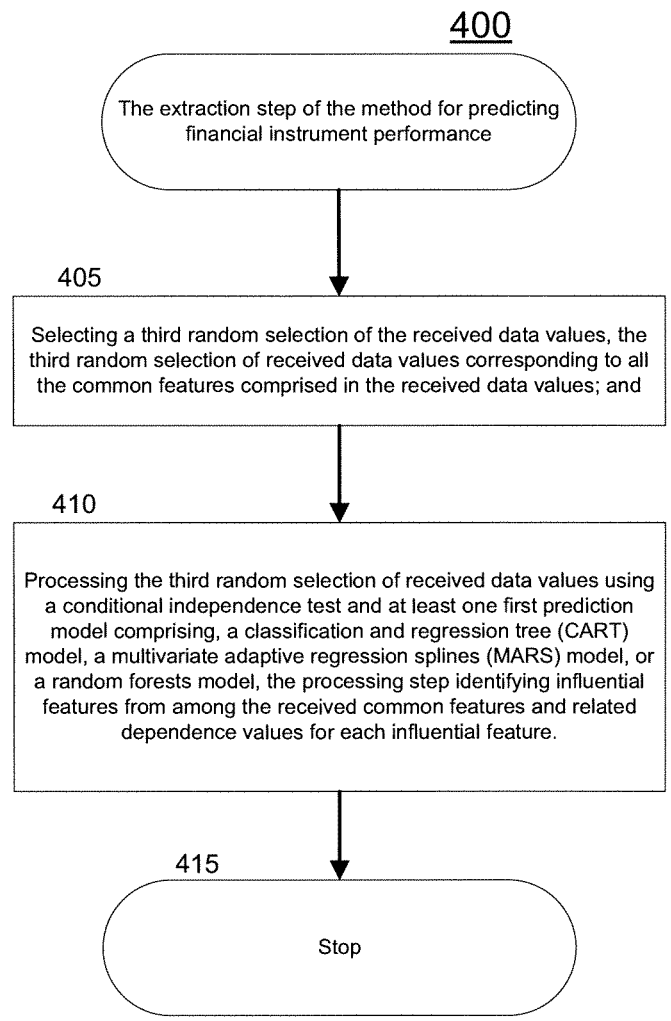
FIG. 4 illustrates the extracting step of the method for predicting financial instrument performance in accordance with an exemplary embodiment.

FIG. 4 illustrates the extracting step 400 of the method for predicting financial instrument performance in accordance with an exemplary embodiment. The prediction software may perform the exemplary steps 400 via blocks 405 and 410. Block 405 selects a third random selection of the received data values, different from previous random selections in the methods 200 and 300, but may include overlapping received data values. The third random selection of received data values corresponds to all of the common features included in the received data values. Block 410 performs a processing function on the third random selection of received data values using a conditional independence test and at least one first prediction model including a classification and regression tree (CART) model, a multivariate adaptive regression splines (MARS) model, or a random forests model. The result from the processing function in block 410 is a variable importance plot and a dependence plot, where the variable importance plot provides influential features from among the received common features and the dependence plot provides related dependence values for each influential feature. In an exemplary embodiment, Bayesian model averaging (BMA), re-sampling, boosting, and smoothing functions may be applied to improve the CART model.

Computing conditional independence in learning Bayesian Networks is described, for example, by Luis de Campos in "*A Scoring Function for Learning Bayesian Networks based on Mutual Information and Conditional Independence Tests*," Journal of Machine Learning Research, 2006, which is incorporated herein by reference. Computing conditional independence in a Markov Network is described, for example, by Bromberg et al. in "*Efficient Markov Network Structure Discovery using Independence Tests*," SIAM, 2006, which is incorporated herein by reference. Computing conditional independence in Dynamic Probabilistic Networks is described, for example, by Friedman et al. in "*Learning the Structure of Dynamic Probabilistic Networks*," Proceedings of Uncertainty in Artificial Intelligence, 2006, which is incorporated herein by reference. Bayesian CART learning procedures are described by Angelopoulos Proceedings of UAI in "*Tempering for Bayesian CART*," Proceedings of the 22$^{nd}$ International Conference on Machine Learning, 2005, which is incorporated herein by reference.

In an exemplary embodiment, the prediction software may be designed or adapted by the administrator to select the top two or three influential features or influential features above a threshold value of influence to be applied in improving the combined predicted value of the systems and methods disclosed herein. Block 415 concludes the extracting step 400 of the method for predicting financial instrument performance in accordance with an exemplary embodiment.

Figure 5:
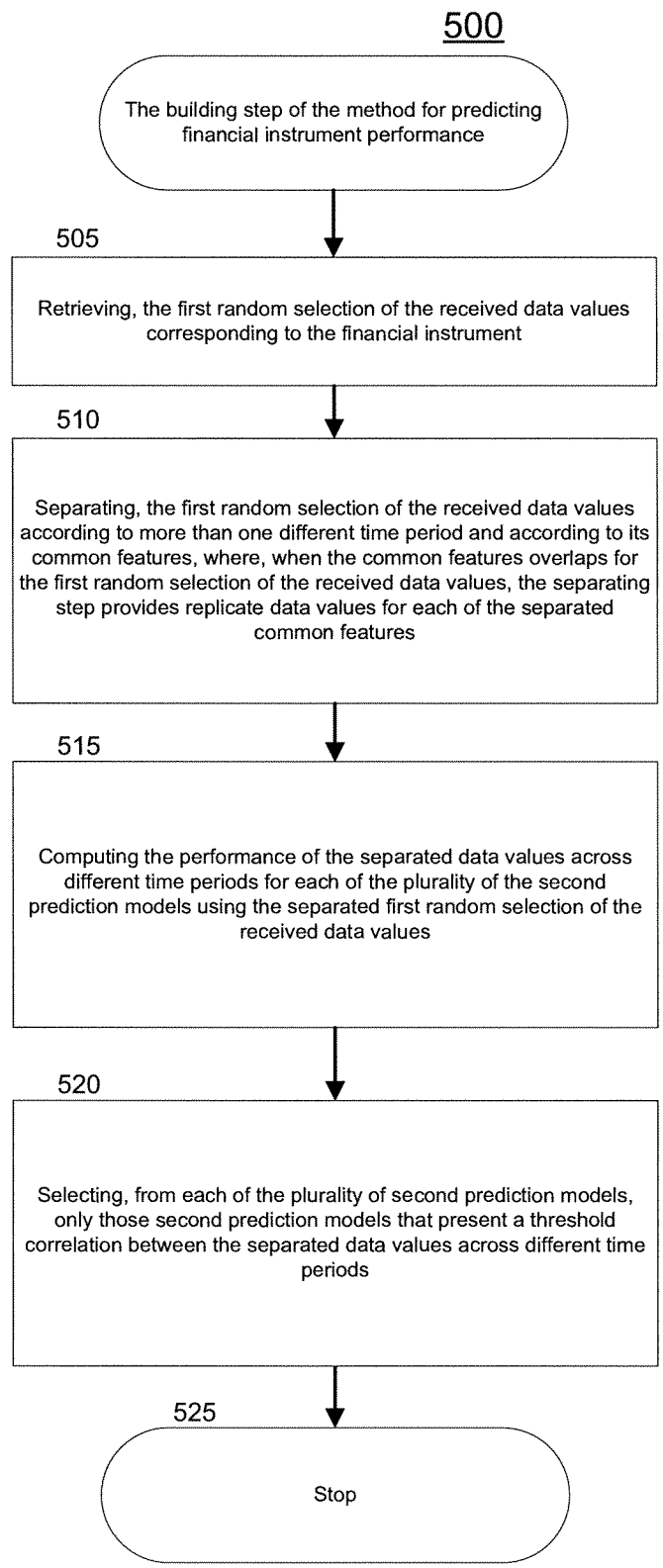
FIG. 5 illustrates the building step in the method for predicting financial instrument performance in accordance with an exemplary embodiment.

FIG. 5 illustrates the building step 500 in the method for predicting financial instrument performance in accordance with an exemplary embodiment. Block 505 of the prediction software performs the building step for creating multiple prediction models for the influential features and the corresponding received data values. The first random selection of received data values corresponding to the financial instrument from block 210 and 215 of the method 200 may be retrieved by block 505. Block 510 performs a separating function, to separate the first random selection of the received data values according to more than one different time period and according to its common features. In an exemplary embodiment, where when the common features overlaps for the first random selection of the received data values, the separating function provides replicate data values for each of the separated common features.

Block 515 performs a computing function for computing the performance of the separated data values across different time periods for each of the second prediction models using the separated first random selection of the received data values. The performance may be a measure of the classification of the first random selection of the received data values across different time periods for each of the second prediction models. Block 520 performs a selecting function to select, from each of the second prediction models, only those second prediction models that present a threshold correlation between the separated data values across different time periods. Here, a threshold correlation may relate to correlation among different predicted values, for the same influential feature, over different prediction models. By way of an example, the correlation threshold is pre-determined to 60%, which may imply that if two prediction models provide correlated predicted values (performance classifications of 75% or higher for each) at a correlation threshold of 60% of the predicted values, then the two prediction models are selected for building the final predicted models. The predicted values may also be generated across different time periods, where the threshold correlation-ship has to hold true across multiple time periods. Block 525 concludes the building step 500 of the method for predicting financial instrument performance in accordance with an exemplary embodiment.

Figure 6:
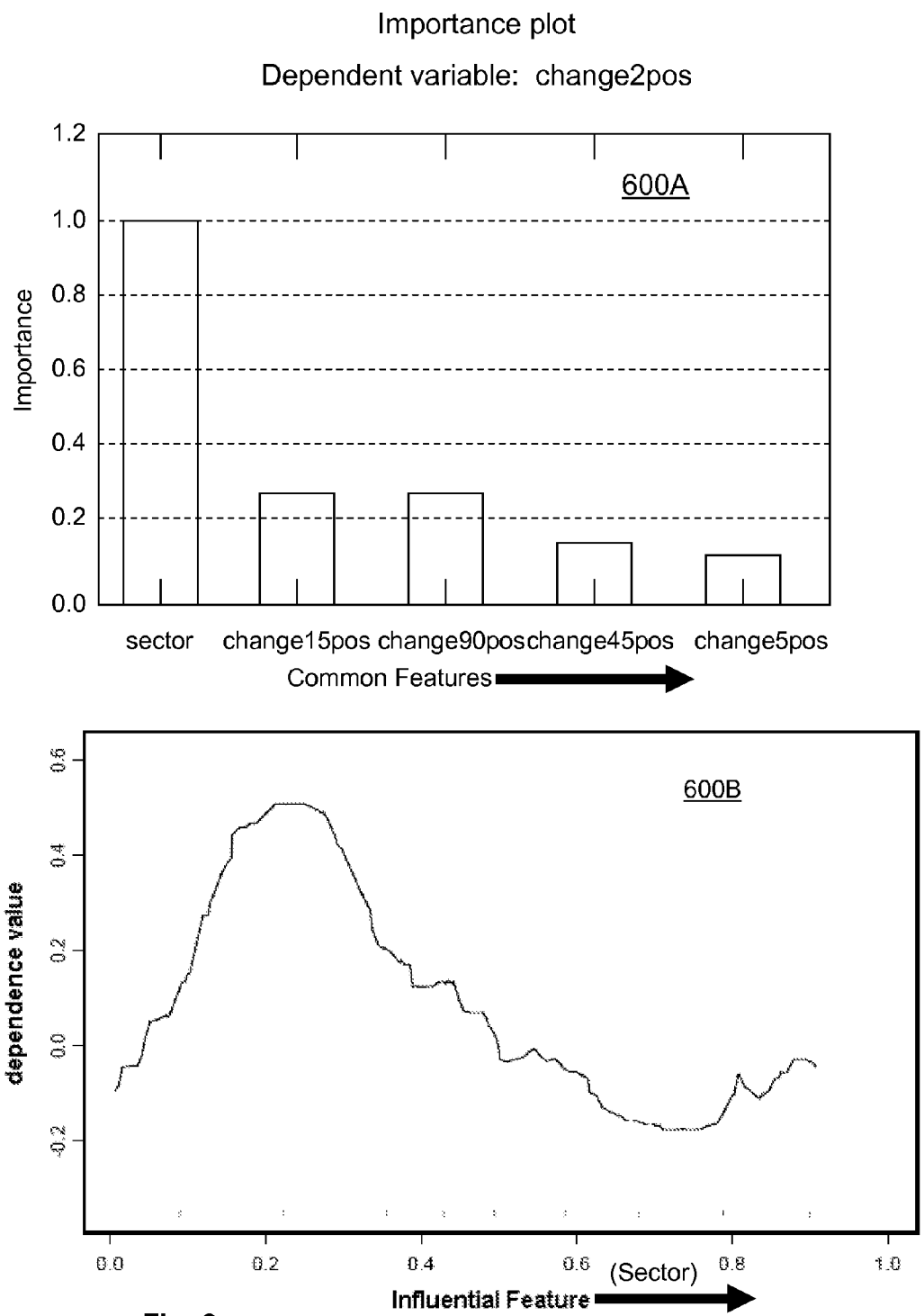
FIG. 6 illustrates an importance plot and a dependence plot associated with an exemplary financial instrument for extracting influential features and a dependence value, in accordance with an exemplary embodiment.
Figure 7:
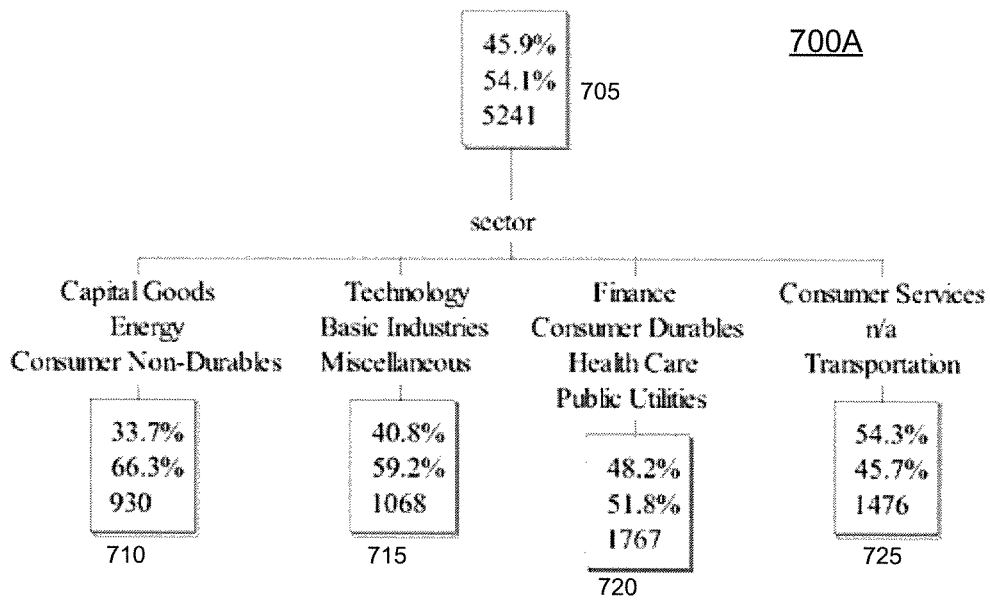
FIG. 7 illustrates individual prediction models for different influential common features, in accordance with an exemplary embodiment.
Figure 7:
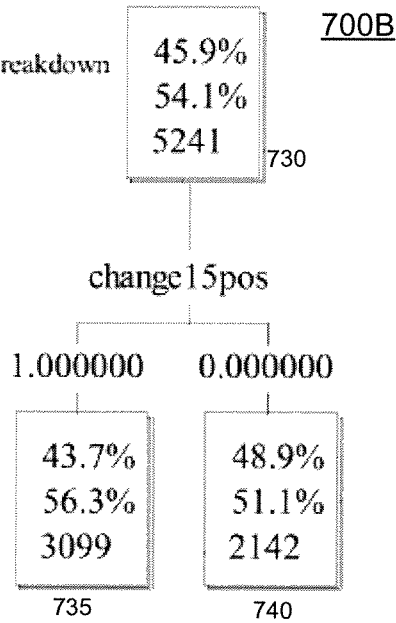

FIG. 6 illustrates an importance plot 600A and a dependence plot 600B associated with an exemplary financial instrument for extracting influential features and a dependence value, in accordance with an exemplary embodiment. The two plots can be generated as part of the extracting function of the prediction software. The x-axis of 600A features the common features underlying the received data values. The common features may be received as part of the received data values, submitted by the administrator of the prediction software system and method, or automatically generated from the computer-based sources previously discussed with respect to FIG. 1. The y-axis provides the importance values for each of the features. The importance value may be computed by creating a learning tree from the received data values and bootstrapping a random selection of the received data values as a training set, thereby generating an in-bag and an out-of-bag set of values for successive tree branches. An example of a learning tree is illustrated via prediction models in FIG. 7, though the learning tree in FIG. 7 is a prediction model for the influential features generated at the building step of the prediction software. In an exemplary embodiment, the prediction model for the building step may use the same prediction model that was used in the extracting step. However, the different branches of the learning tree in the building step would relate to the different influential features. The importance plot 600A shows that the influential features are "sector" and "change15pos." Change15pos is the change in performance of a selected financial instrument over the past 15 days.

The branch of each of the learning trees in the extracting step may be associated to one or more common features. A single financial instrument may classify into multiple sectors or valuations. For example, a 1 day old closing value may be included in a 15 day range of closing values (as the $15^{th}$ day). For sectors, a financial instrument issued by a company that sells financial products as well as technology products may classify under both categories. The classification for each branch is verified using the out-of-bag data set to test the learning of the prediction model, trained at the branch by the in-bag data set. The count, or the number of occurrences of a correct classification, is counted up the tree, the average of this count for classification of the same attribute down multiple branches of a learning prediction model is the importance value. A low score indicates poor relationship between a common feature and the classification of the prediction model in the extraction step. A high score indicates that the common feature classifies well and is a good feature to be used in future prediction models, such as at the building step. In an exemplary embodiment, at least two common features with high scores may be selected for the building step.

FIG. 7 illustrates individual prediction models 700A and 700B for different influential common features, in accordance with an exemplary embodiment. The influential features from FIG. 6 may be applied to one of a number of prediction models, including, for example, a random forests prediction model. In 700A, the tree is initiated by the first box 705, which is a first node trained to recognize a certain data value, where, in this example, the data value is related to a single common feature, i.e., the change15pos feature. The box 705 includes an initial set of 5241 data values from the received data values. These data values may be a random selection sample from the received data values. The percentage values indicate how many variables among the initial set classify within the trained prediction model at the node. Accordingly, in the first box 705 for 700A, 54.1% of the initial set classify within the sample set as sector data. Typically, half to a third of the initial set is used to train for further branches of the prediction model 700A. As illustrated in FIG. 7, the 5241 data values are classified into the various sectors under the "sector" common feature. Box 710 includes a classification percentage of 66.3% for its share of 930 of the 5241 data values. The high classification rate indicates that the data values received classifies best under the category for box 710, the capital goods, energy, and consumer non-durables sector.

Figure 8:
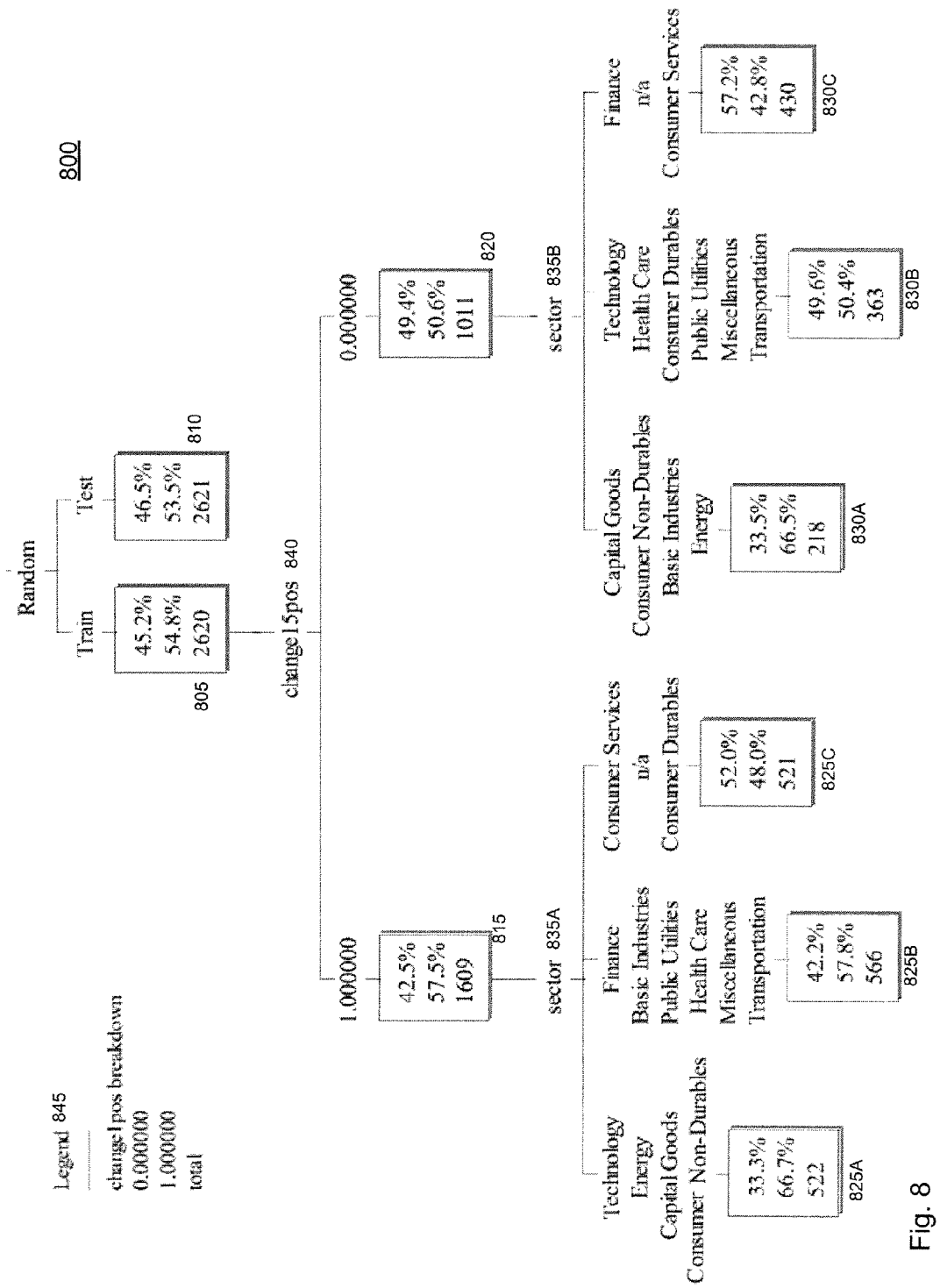
FIG. 8 illustrates a combined prediction model and combined prediction data values for predicting financial instrument performance in accordance with an exemplary embodiment.
Figure 9:
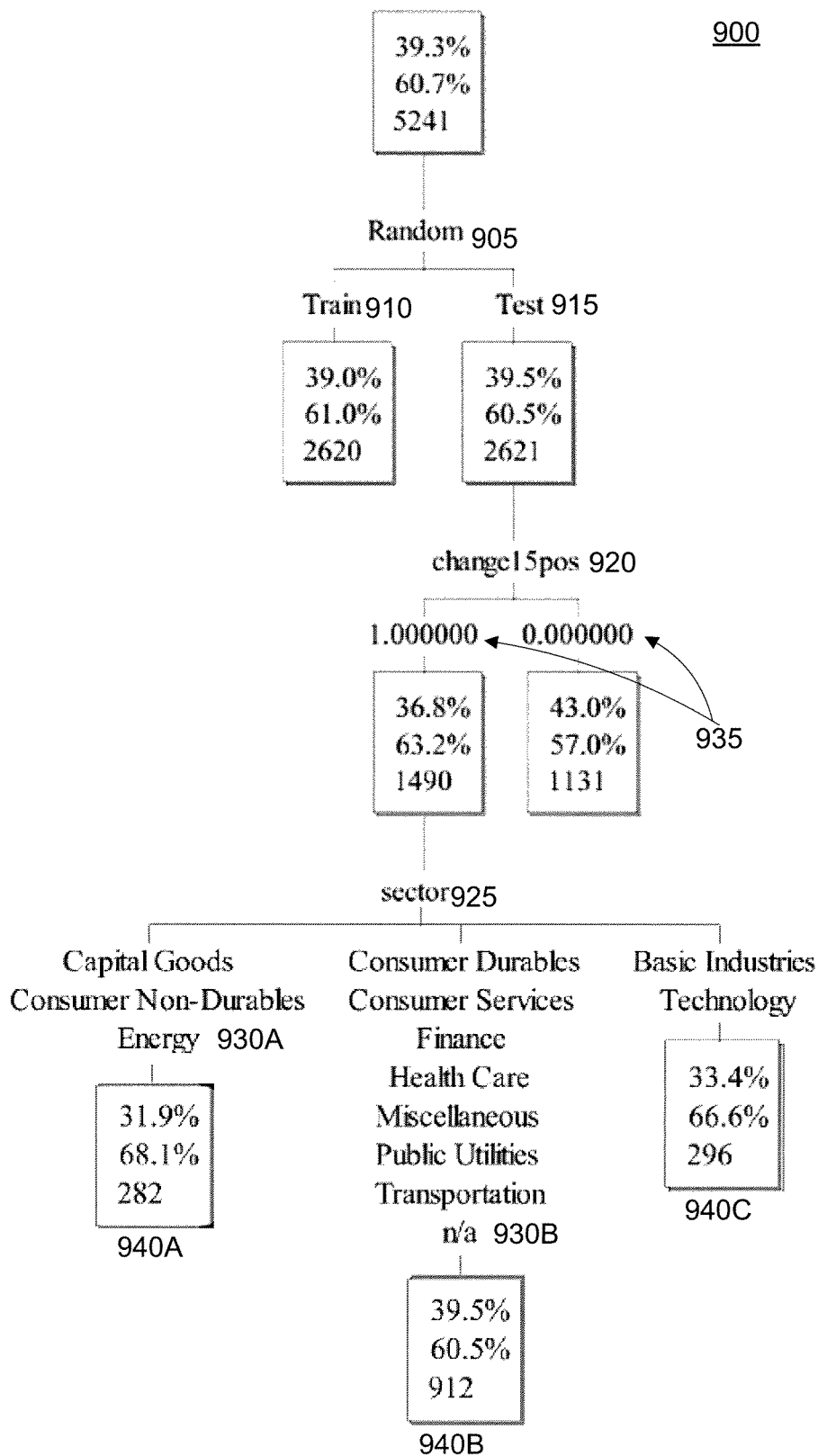
FIG. 9 illustrates an adapt/learn function as applied to the combined prediction model and combined prediction data values for predicting financial instrument performance in accordance with an exemplary embodiment.

In an exemplary embodiment, proprietary or open-sourced software tools such as statistical programming language "R®" or KnowledgeSeeker® may be incorporated into the main prediction software application 145 as a part of the processing module 150, as illustrated in FIG. 1. These software tools accept data inputs from blocks 210 of FIG. 2, and generate the decision trees illustrated in FIGS. 7-9. The percentage values within each of the nodes in the trees of FIGS. 7-9 represent the correct and incorrect classifications of the data values from the previous nodes. The trees are designed to progress along the branch that offers the higher correct classification of data values. The nodes on the decision trees also identify the different common features, when multiple common features are selected. In the case of FIGS. 8-9, there multiple common features are representative of hybrid models of classification and prediction according to certain exemplary embodiments described herein.

700B of FIG. 7 uses the same data to classify into the change15pos common feature or attribute for the prediction model represented by 700B. The prediction models 700A and 700B may be similar algorithms, e.g., random forests, MARS, or CART prediction models. Further, 700A-B may be computed from within the same prediction model, as part of a bigger tree, where the tree's root initiates with the entire set of received data values. In 700B, the prediction model uses the same 5241 samples of the received data values to verify classification under change15pos as indicated in box 730. The 5241 data values are forced to classify data from the change15pos part of the received data values into a change1pos classification, where change15pos indicates stock valuations, closing value, opening values, or volumes over a 15-day period, and change1pos indicates the same attributes over a 1-day period. The change1pos feature is allocated a value of 1, indicating good classification or 0 days to indicate poor classification, see legend 745. The resulting classification count in boxes 735-740 indicate how the data classifies for a change1pos classification from the change15pos data sample. 56.3% of the data values in box 735 indicates that data values did change 1 day prior to the sample (i.e., change1pos is a common feature assigned to data collected a day before the prediction software is executed).

FIG. 8 illustrates a hybrid or combined prediction model 800 and combined or hybrid prediction data values (825A-C, 830A-C, and 815-820) for predicting financial instrument performance in accordance with an exemplary embodiment. The prediction model 800 being applied may be a single random forest prediction model for predicting the valuation of a financial instrument using two different influential features, the price change over 15 trading days to the execution day of prediction software (change15pos) 840 and quantitative information on the sector 835A-B that is associated with a financial instrument. The sector attributes may be assigned numerical representations to assist the classification and prediction models. As with FIG. 7, the independent trees for the independent influential features are combined to represent a single tree, where the root data is randomly selected from the 5241 data values after which the random selection may be distributed for training 815 and testing 820 multiple nodes of the prediction model 800. Each node may be considered to be a single prediction model, and the value of 1 and 0 is assigned to the node to indicate a match or a no match to the trained classification.

The prediction model 800 is a trained prediction model, with the test box 810 left for testing the prediction model with a second random selection of data values. This may be used to verify correctness of the combined prediction model for the purposes of adapting the prediction model 800 based on new data values received post-execution of the prediction model. With the testing box 825A, at least 66.7% of the data values are classified as change1pos (see legend 845) data values and further classified within sector 835A as part of the technology, energy, cap goods, and consumer non-durables sector. The financial instrument, whose data values are being analyzed, indicates a positive change in the last day of trading prior to executing the prediction model. This information indicates that financial instruments belonging to the same cluster as the analyzed financial instrument may perform well in future trades over a limited period, where the limited period may be estimated by analyzing data from a longer historic period.

FIG. 9 illustrates an adapt/learn function as applied to the combined prediction model and combined prediction data values for predicting financial instrument performance in accordance with an exemplary embodiment. The trained prediction model 800 from FIG. 8 may be implemented for purposes of testing and adapting as illustrated in FIG. 9. The test 915 function follows the training process discussed previously with respect to FIG. 8, using a random selection of data values from the 5421 data values with replacement. The test system shows allows adapting the trained system using additional data values, thereby showing improvements in the resulting classification. By way of an example, box 940A shows a classification at 68.1% for the category on capital goods, consumer non-durables, and energy. Select financial instruments within the classification of sector shown in box 940A will provide a trader with winning stocks, based on the prediction model of FIG. 9. Further, if another branch is added beyond 940B, by sampling the data from 940B as another iteration, then the 68.1% may surpass a 70% classification accuracy.

In certain exemplary embodiments, when the step of extracting influential features, illustrated by block 210 of FIG. 2, identifies different influential features than previously used to build the combined prediction models illustrated in FIGS. 7-9, then the adapting/learning module 160 may force the prediction software application 145 to train the system, thereby incorporating the newly influential features, and related data values. The new combined prediction model will be consistently focused on identifying influential features and current trends following the current fluctuations in the securities associated with the system 100.

Figure 10:
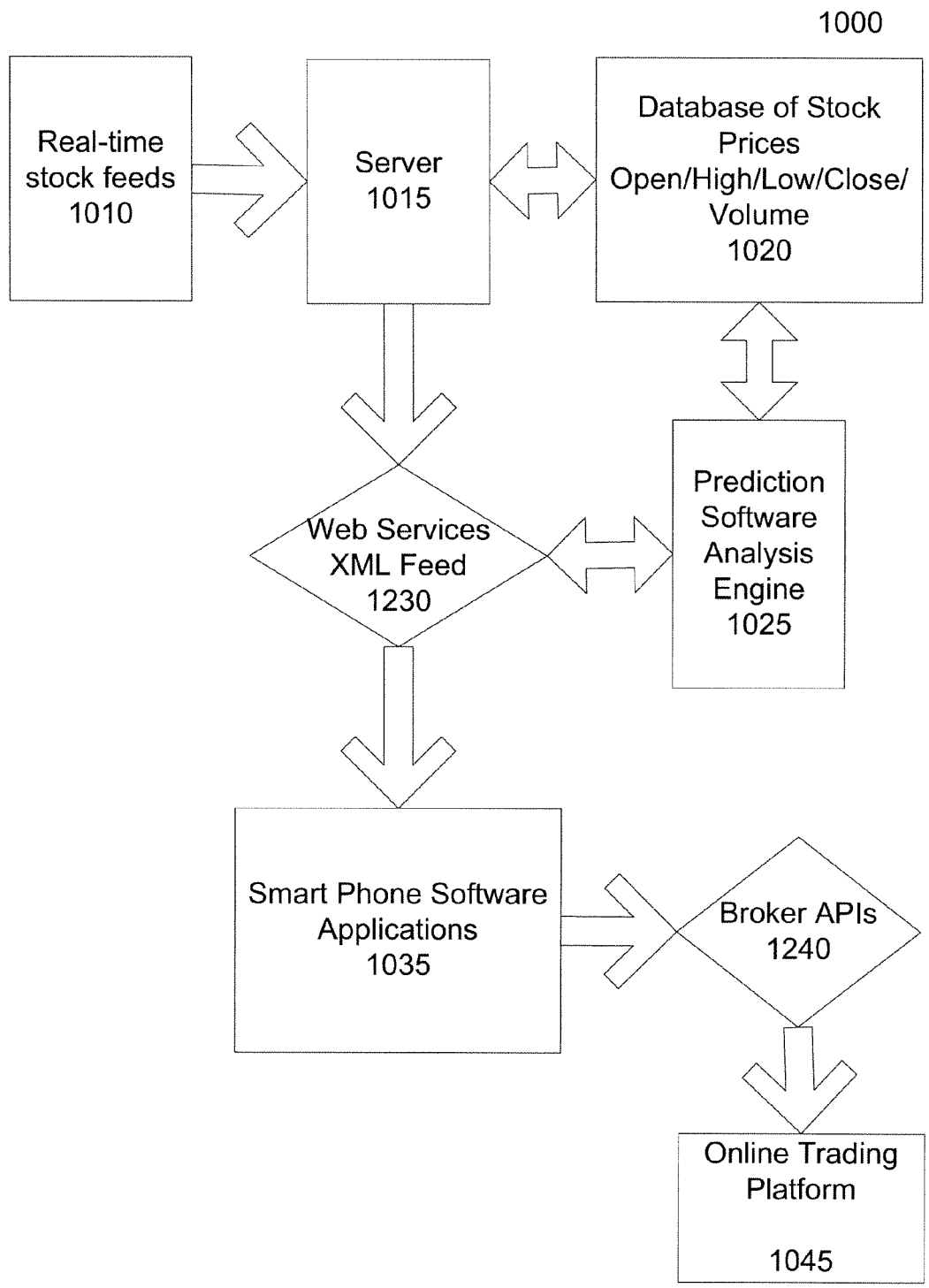
FIG. 10 illustrates a method for providing predicted financial instrument performance data via feeds to computing devices and trading platforms in accordance with an exemplary embodiment.

FIG. 10 illustrates a method 1000 for providing predicted financial instrument performance data via feeds to computing devices and trading platforms in accordance with an exemplary embodiment. As discussed with respect to FIG. 1, financial resources used in the prediction models disclosed herein include the use of real-time stock feeds 1010. The stock feeds are received from various subscribed services, and are directed to a server 1015 for storage, formatting, and distribution to client computing devices. By way of an example, web services XML formatted feed 1030 may be generated from the server to be distributed to XML supported devices, include application for smart phone software applications 1035. Raw stock data from the real-time stock feeds can also be extracted and stored within the database 1020 in communication with server 1015. By way of an example, real-time stock prices; closing and opening prices and volumes; and high and low prices and volumes may be extracted from the real-time stock feeds for use in the prediction software analysis engine 1025. In the prediction software analysis engine 1025, analysis discussed with respect to FIGS. 2-9 are performed on the extracted stock data values, in real-time. The results from these values may augment the web-services XML feed, thereby providing real-time stock values as well as predicted values to the smart phone software application 1035. In another exemplary embodiment, the smart phone software application 1035 may be provided as broker application programming interface (API) functions 1240 to be embedded into external trading platform's websites 1045.

Figure 11:
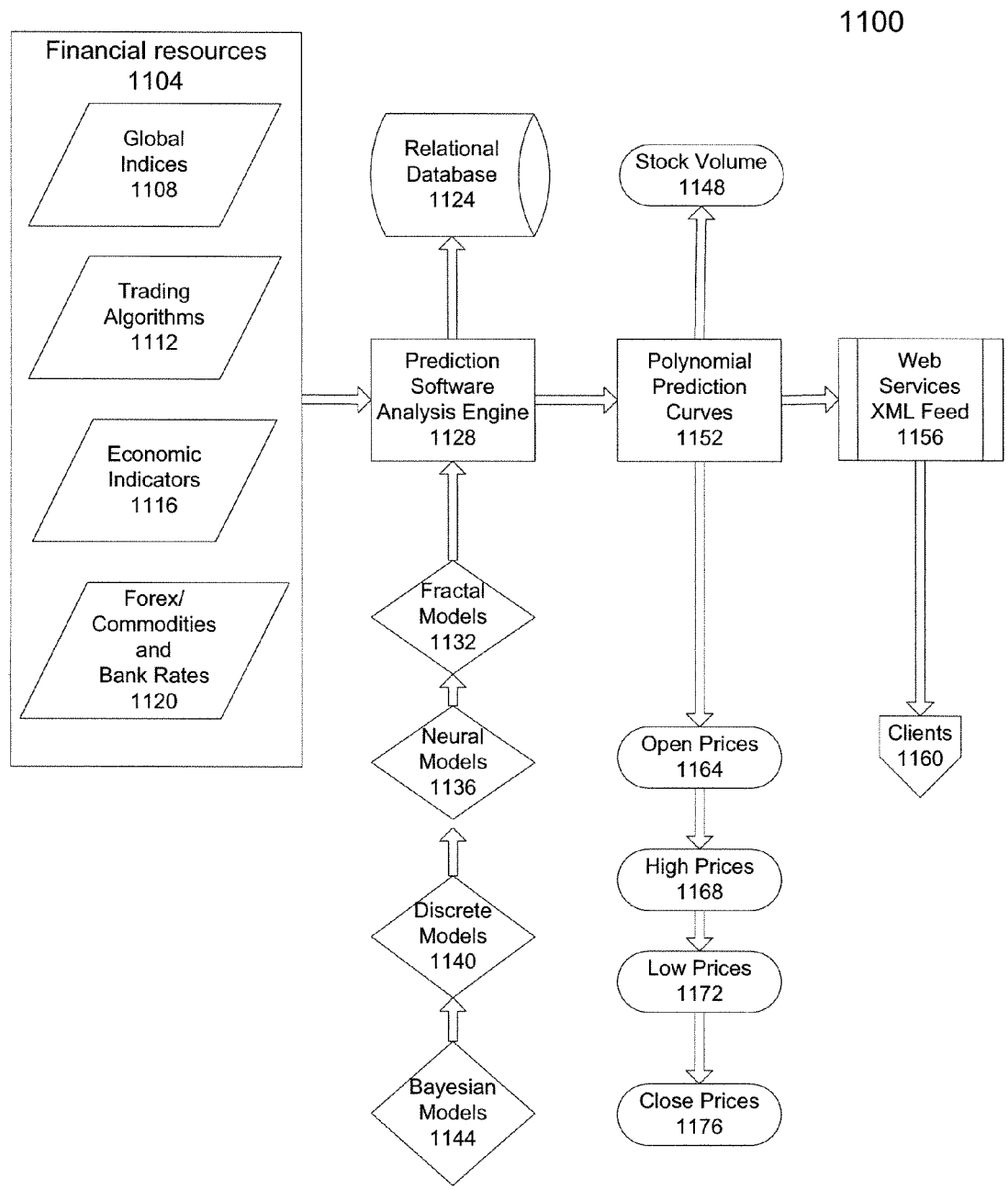
FIG. 11 illustrates a method for using various financial resources to generate feeds for computing devices in accordance with an exemplary embodiment.

FIG. 11 illustrates a method 1100 for using various financial resources to generate feeds for computing devices in accordance with an exemplary embodiment. FIG. 11 describes exemplary computer-based sources previously discussed with respect to FIG. 1, including financial resources 1104, each financial resource used to generate data value inputs to the prediction models via the prediction software analysis engine 1128 disclosed herein. The financial resources 1104 include global indices 1108; trading algorithms 1112; economic indicators 1116; and FOREX, commodities, and bank rates 1120. Each of these inputs are tagged with a feature description and are analyzed in the prediction software analysis engine 1128 using the combined prediction models described above, to identify which of these resources provide common features that are influential features. The resulting classification values and influential features identified by engine 1128 are stored, along with the real-time data from the financial resources 1104 in a relational database 1124, for future verification, to authenticate the prediction model used, and influential features selected based on the resulting real values and the predicted values.

Supporting the prediction software analysis engine 1128 are one or more prediction and training models with the method 1100. By way of an example, a fractal model 1132, a neural model 1136, discrete models 1140, and Bayesian models 1144 may be implemented with the prediction software analysis engine 1128. Some of the models have been discussed in detail above, to create a combined prediction model, and to identify influential features. The prediction software model may generate prediction curves, represented by block 1152, where the prediction curves may be a regression plot, or any two dimensional mapping of common features with the their influence on stock performance. The mapping provides a determination of influential features that may be applied to the input features, e.g., stock volume 1148, open prices 1164, high prices 1168, and close price 1172. This information is then forwarded to the XML feed 1156 for distribution by any available media to clients and client devices 1160 as explained with respect to FIG. 10.

Figure 12:
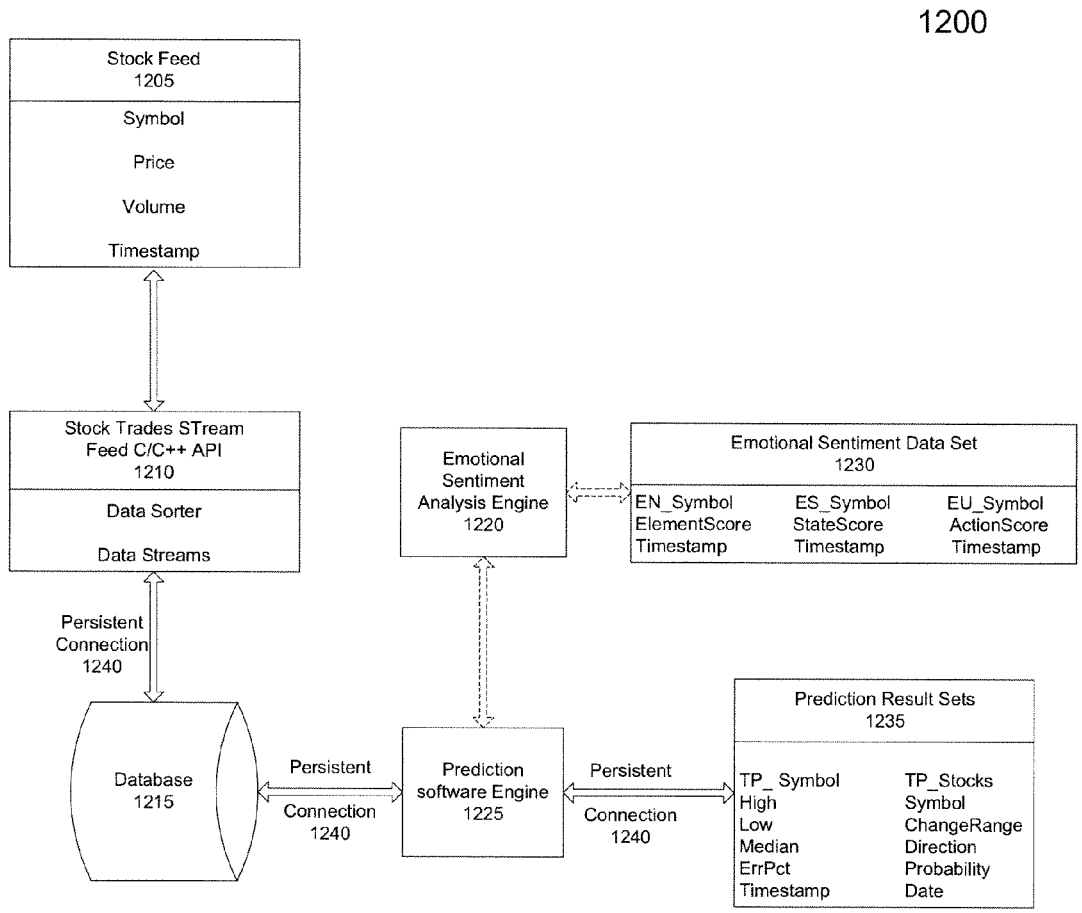
FIG. 12 illustrates a method for using emotional sentiment data in the prediction model in accordance with an exemplary embodiment.

FIG. 12 illustrates a method 1200 for using emotional sentiment data in the prediction model in accordance with an exemplary embodiment. Emotional sentiment data applies to gauging the sentiment of textual and visual data. In one example, news articles, blogs, social networking media, and other visual and textual media are used to extract text and image information. A software analysis tool incorporating one of several classification and learning methods disclosed above may be deployed via the emotional sentiment analysis engine 1220 to learn and classify textual and visual information with respect to certain entities that provide financial securities on the market. The textual information may be parsed and analyzed for positive and negative emotional texts, wherein a context may be assigned to the text, so as to filter errors and not learn individual words in the absence of a meaning. By way of an example, if the general stock market performance, and a sector performance have been good in a sample set, the parsed textual information from the new articles, blogs, and social media are weighed based on the context of the entire market and select industries that a stock may fall within. Any contradictory analysis is further scrutinized based on historical learning to utilize or negate the contradictory effect.

In an example, in some cases, the general market may perform well, while a certain industry or group may perform poorly. The textual content for a company within the poorly-performing industry is analyzed in view of the industry, as well as the general market. Further, historical context may be provided by verifying is similar data patterns existed in the past. Weights assigned to the textual content may be varied in the presence or absence of historical data patterns. Words defined as positive include, "success," "good," "high," and several other positive-impact type words. Negative words include, "low," "poor," "fail," and several other negative-impact type words. A database of emotional sentiment data sets 1230 is generated using a general crawling algorithm to crawl external computer-based sources for textual content. The parsed information is analyzed by weighing, classifying, and learning, using methods disclosed above. The result of the analysis is one or more scores assigned to the stock/instrument symbol assigned to a company on which the analysis is performed.

In one example, the database of emotional sentiment data sets 1230 includes symbols for storing various information, e.g., the EN_symbol for elementscore, the ES_Symbol for StateScore, the EU_symbol for ActionScore, and the other data sets of FIG. 12 tagged with the word symbol. These symbols represent elements whose classifications include textual data; indirect information from news and third party content; and direct information from companies via press releases, filings, and related information. The action score of the EU_symbol represents action-based information, such as social media items like Twitter® messages or when a user of system 100 announces that he or she likes a stock or purchased a stock, and other such action items. Analyst reports and opinions typically classify in the element class but may sometimes classify as action classes. An ElementScore, StateScore, and ActionScore are assigned to the symbols, along with a timestamp indicating when the scores were generated. The scores provide such information as current emotional state of the instrument (StateScore) per the crawled web-sourced data, the current ElementScore may represent a score assigned to the instrument prior to the StateScore, and the ActionScore may indicate the score at which an action may be performed.

The prediction result sets 1253 provides data sets of the values for certain instruments identified by the symbols (TP_Symbol, TP_Stocks). Values include High and Low values; ChangeRange of values and Median value; Direction of change, Probability values, and error percentage (ErrPct) based on the probability value. There is a persistent connection 1240 established between the data sets 1235, the prediction software engine 1225, and the database 1215, thereby providing the database with constantly updated prediction data and real-time data. The persistent connection 1240 extends to the stream feeding software 1210 to generate C/C++ APIs for the feed streams to various system. In an alternative embodiment, XML APIs may be used depending on the receiving clients. The stock feed 1205 provided by the API includes the symbol of the financial instrument, the price, volume, and the related timestamp of this data. Blocks 1245, 1250, and 1255 represent the data sets associated the emotional sentiment engine and the prediction software engine.

In one example, for each symbol there is a separate table for all trades, this could be flat file T Symbol containing information for each trade, price, volume and a microtimestamp. Further, for each symbol there is a separate table for all minute bars, e.g., TB_Symbol contains information for each minute, price, volume and a timestamp. For all stocks there is a table for macro information, which could be flat file with stocks containing information for each stock, symbol, market (NASDAQ, NYSE, AMEX), company name, SIC code, sector, industry, initial public offering (IPO) date, symbol begin, previous symbols [dates]. For all stocks there is a table for all splits, e.g., T_Splits which contains information for each stock split, symbol, ratio, date, price (pre-split and post-split). For each stock there is a "minute candlestick table charting" stored via the TCM_Symbol, which contains information for each stock, open, high, low, close, volume, time for each stock there is a "daily candlestick table charting" in the form of a TCD Symbol contains information for each stock, open, high, low, close, volume, and time.

Figure 13:
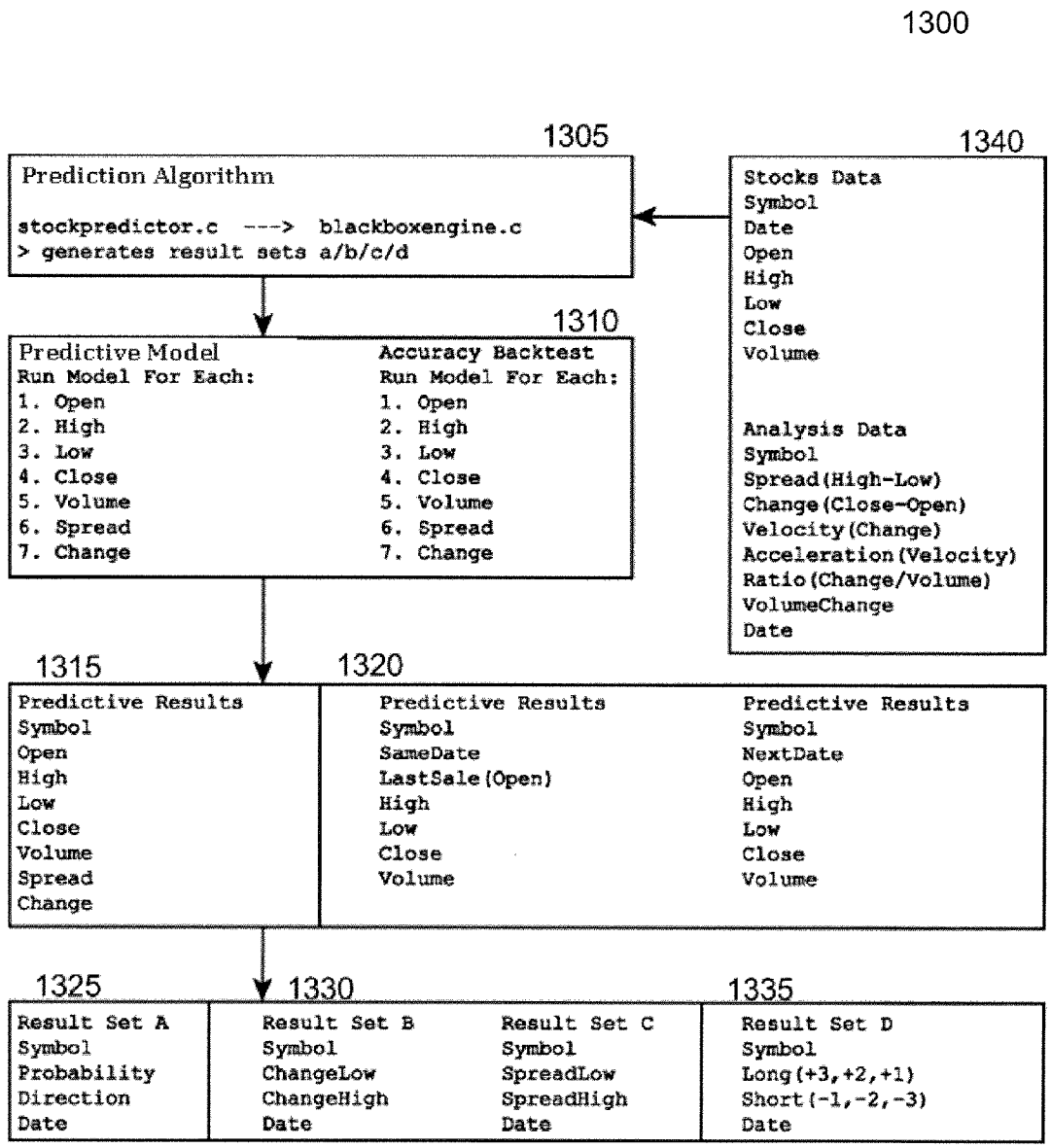
FIG. 13 illustrates a flow of exemplary common features and related data inputs to the prediction model, as well as the influential features and related data outputs from the prediction model in accordance with an exemplary embodiment.

FIG. 13 illustrates a flow 1300 of exemplary common features and related data inputs to the prediction model, as well as the influential features and related data outputs from the prediction model in accordance with an exemplary embodiment. The stocks data (current), and the analysis data (historical), illustrated in block 1340 are provided to the prediction algorithm in block 1305, representing the prediction software analysis, explained in detail with respect to FIGS. 1-9. Block 1310 runs the predictive models for each of the feature data values (1-7) provided. There is an accuracy back-test function for each of the feature data values (1-7) to analyze the predicted versus actual values. Blocks 1315 and 1320 stored the predictive results for each feature, for each financial instrument, from the prediction software analysis engine. Blocks 1325-1335 provide the results via, for example, a ranking of the best features to be used for the selected financial instrument.

Figure 14:
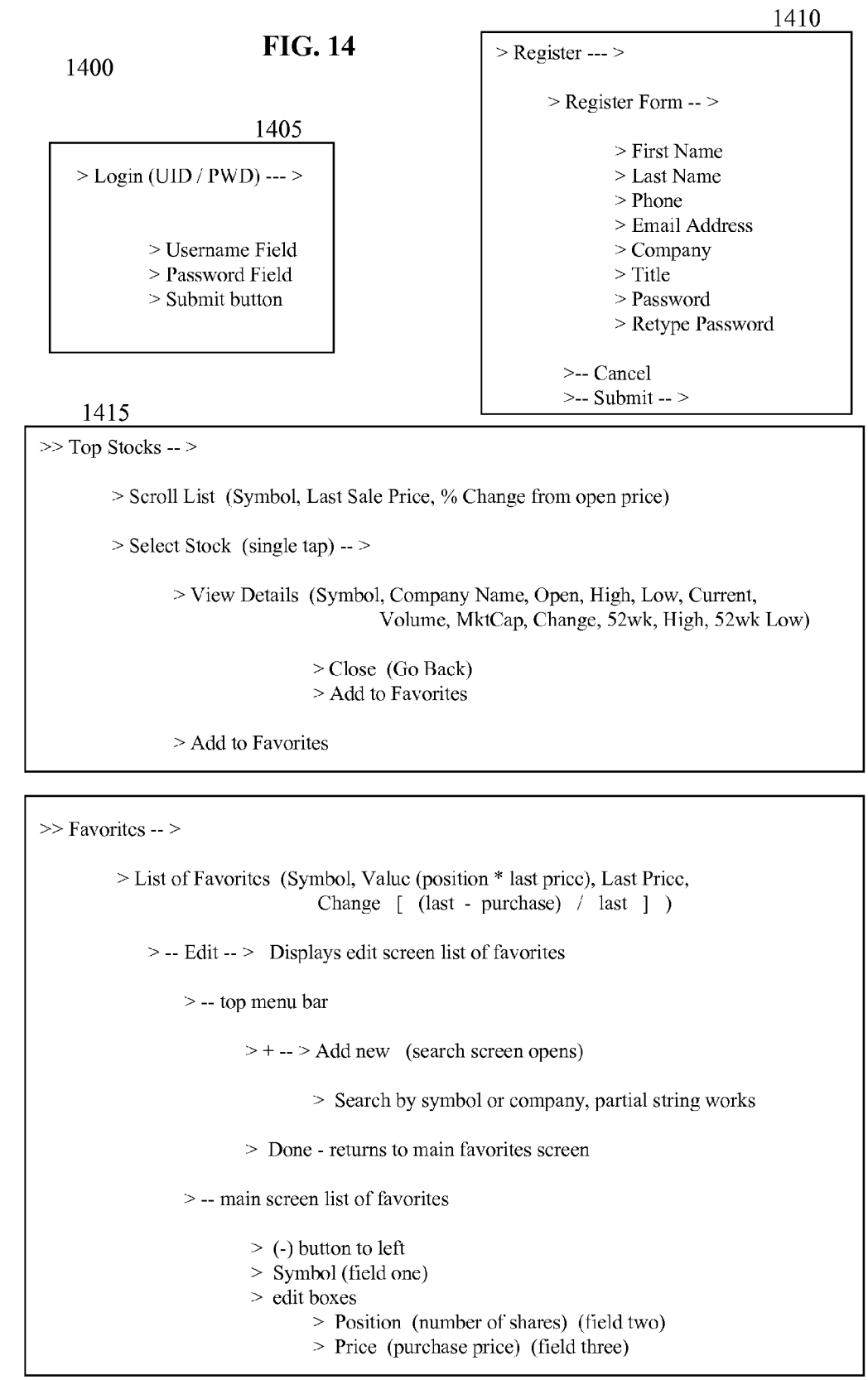
FIG. 14 illustrates a system for receiving predicted financial instrument performance data via feeds to computing devices and trading platforms in accordance with an exemplary embodiment.

FIG. 14 illustrates a system 1400 for receiving predicted financial instrument performance data via feeds to computing devices and trading platforms in accordance with an exemplary embodiment. Block 1405 illustrates an exemplary login module provided to client computers A-X of FIG. 1. Block 1410 illustrates a registration step for a first time user of an exemplary software application for receiving predicted financial instrument performance data via feeds. Block 1415 illustrate the programmatic functions used in graphically displaying top stocks and favorites to the user of the client computer A-X.

Figure 15:
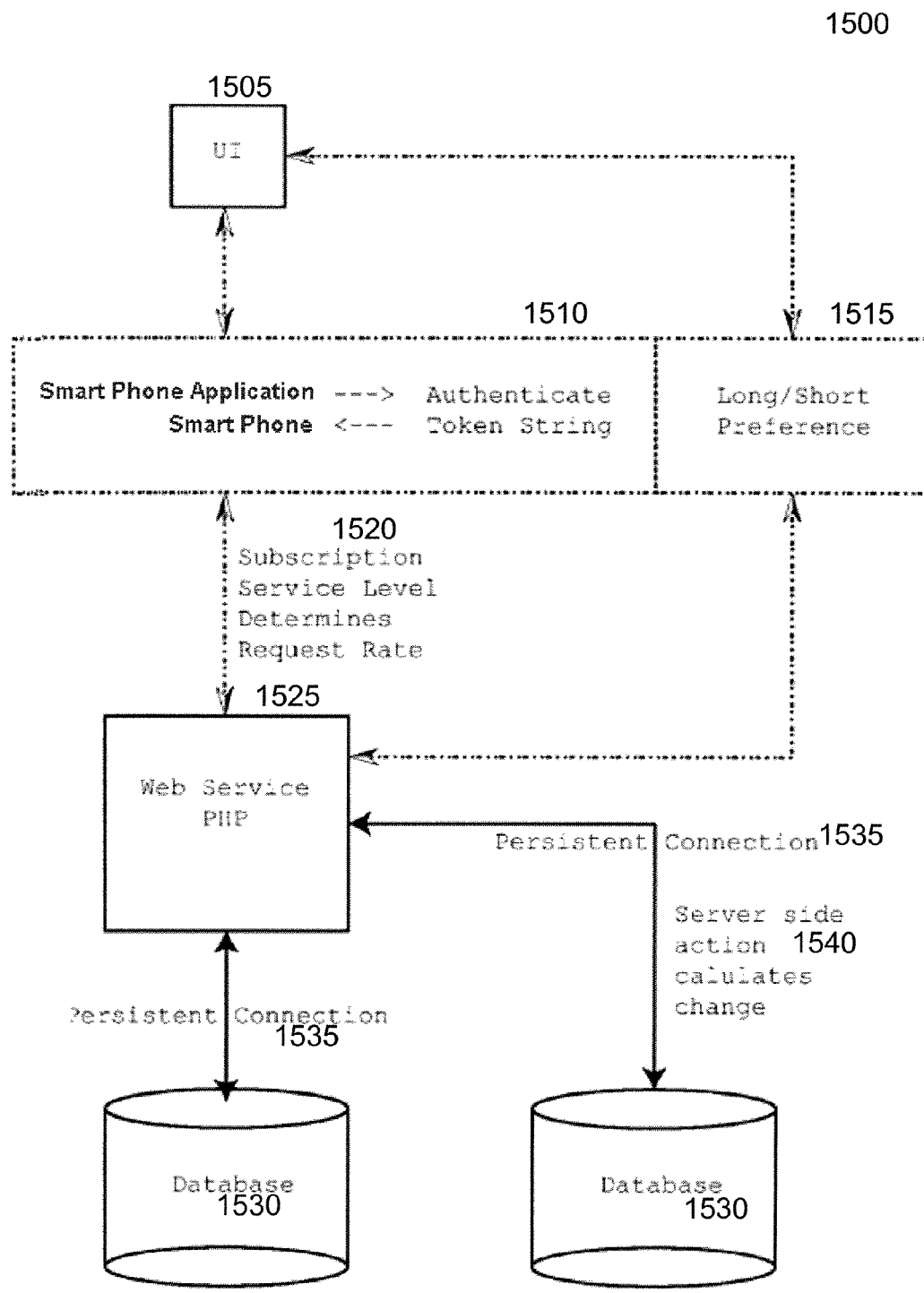
FIG. 15 illustrates a system for receiving predicted financial instrument performance data via feeds to computing devices and trading platforms in accordance with an exemplary embodiment.

FIG. 15 illustrates a system 1500 for receiving predicted financial instrument performance data via feeds to computing devices and trading platforms in accordance with an exemplary embodiment. User Interface (UI) is illustrated via block 1505, which is sends and receives data between a user and the smart phone application illustrated via blocks 1510-1515 which may be a shell application for the prediction software application. The shell application performs no analysis but receives, updates, and displays data for the user. Alternatively, in an embodiment, the smart phone may perform some analysis for classification and training of certain data for faster responses and offline-responses in the absence of a communication signal. After various authentication schemes have been completed, with respect to the use of web service PHP server block 1525 for authentication of the user, the service is initiated 1520. A persistent connection 1535 between the databases 1530 ensures that the data is updated to the current performance of any financial instrument.

In an exemplary embodiment, service levels intervals are every 10 minutes for a 1 second transmission rate, 30 minutes at 5 seconds, 1 hour at 20 seconds, 2 hours at 60 seconds, 4 hours at 120 seconds, or 30 minutes before market open. For each service level request is made at interval, each request may consist authentication token string, and a service level identifier. Each valid request is delivered a real-time response including last sale price (server side real-time) and change [(last−open)/open)]. As stocks are delivered, they appear in the top stocks listing on main app screen, while new stocks are entered at top of list as day progresses the list (stack) gets longer. While the shell application is open, data updates refresh the quote at intervals and gets most current real time price, depending on the service level. The application also gets both last price and change, which updates the favorites. End of trading day is provided 20 minutes after market closing, and top stocks listing clears for the day.

Figure 16:
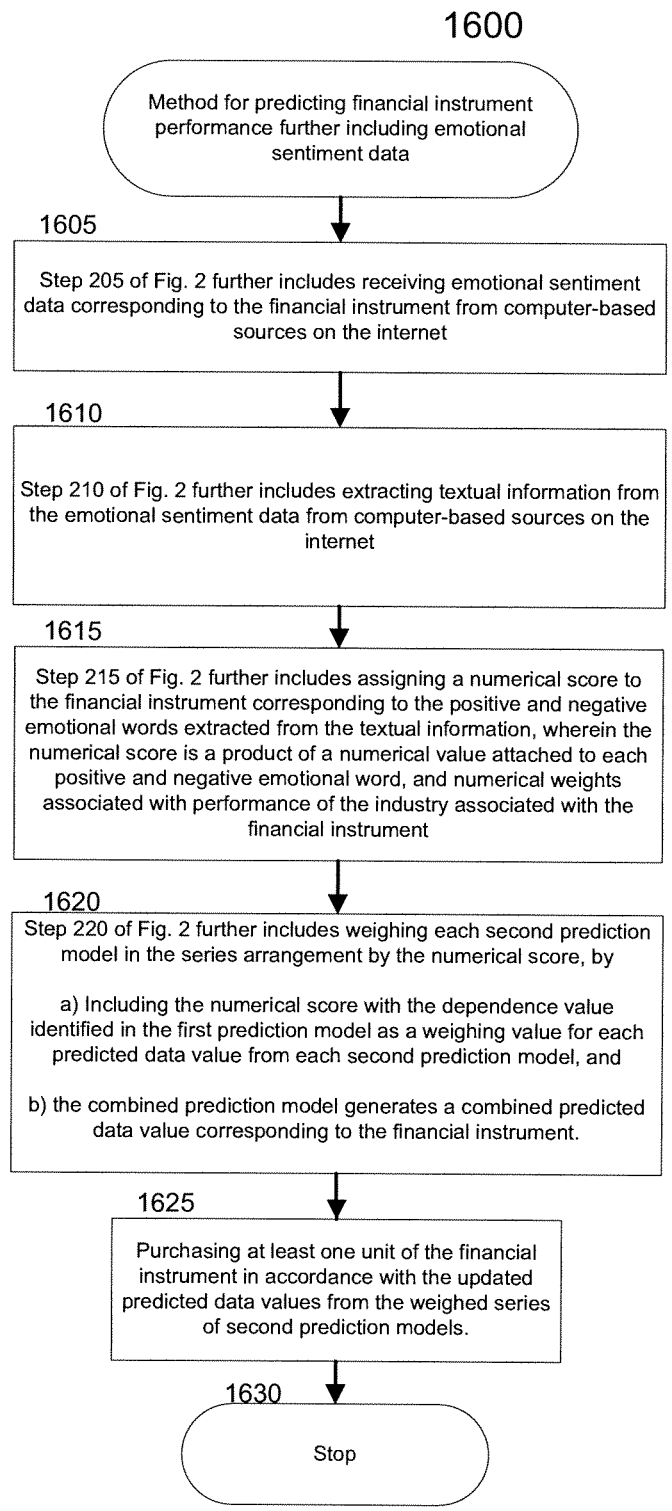
FIG. 16 illustrates a method for predicting financial instrument performance including emotional sentiment data, in accordance with an exemplary embodiment.

FIG. 16 illustrates a method 1600 for predicting financial instrument performance including emotional sentiment data, in accordance with an exemplary embodiment. Step 1605 amends step 205 of FIG. 2 by further including received emotional sentiment data corresponding to the financial instrument from computer-based sources on the internet. Step 1610 amends etep 210 of FIG. 2 by further including extracted textual information from the emotional sentiment data from computer-based sources on the internet. Step 1615 amends step 215 of FIG. 2 by further including assignment of a numerical score to the financial instrument corresponding to the positive and negative emotional words extracted from the textual information, wherein the numerical score is a product of a numerical value attached to each positive and negative emotional word, and numerical weights associated with performance of the industry associated with the financial instrument. Step 1620 amends step 220 of FIG. 2 by further including weights assigned to each second prediction model in the series arrangement by the numerical score. These weights may be assigned by including the numerical score with the dependence value identified in the first prediction model as a weighing value for each predicted data value from each second prediction model. Thereafter, the combined prediction model generates a combined predicted data value corresponding to the financial instrument as processed in step 220 of FIG. 2. The resulting updated predicted data values from the weighed series of second prediction models of step 1620 may be used in an additional exemplary step 1625 to purchase at least one unit of the financial instrument. Step 1630 concludes the method 1600 for predicting financial instrument performance by further including emotional sentiment data.

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed without departing from the scope and spirit of the disclosure. Accordingly, such alternative embodiments are included in the disclosures described herein.

The exemplary embodiments can be used with computer hardware and software that perform the methods and processing functions described above. Exemplary computer hardware include smart phones, tablet computers, notebooks, notepad devices, personal computers, personal digital assistances, and any computing device with a processor and memory area. As will be appreciated by those having ordinary skill in that art, the systems, methods, and procedures described herein can be embodied in a programmable computer, computer executable software, or digital circuitry. The software can be stored on computer readable media. For example, "computer-coded," "software," "scripts," "computer-readable software code," and "programs" are software codes used interchangeably for the purposes of simplicity in this disclosure. Further, "memory," "computer-program product" and storage can include such media as floppy disk, RAM, ROM, hard disk, removable media, flash memory, memory stick, optical media, magneto-optical media, CD-ROM, etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

What is claimed is:

1. A method for predicting financial instrument performance, the method comprising:
   receiving, by a computer, data values corresponding to a financial instrument, the data values comprising a plurality of common features;
   extracting, by the computer, using at least a first prediction model, more than one first common feature from the received plurality of common features and a corresponding dependence value for each of the extracted first common features, each of the extracted first common features being an influential feature;
   building, by the computer, a plurality of second prediction models, each of the second prediction models corresponding to each of the extracted influential features and each of the second prediction models using a first random selection of the received data values corresponding to each of the extracted influential features to generate predicted data values corresponding to the financial instrument for each extracted influential feature; and
   combining, by the computer, each of the second prediction models in a series arrangement, wherein the predicted data values corresponding to one second prediction model is input to another second prediction model until all the second prediction models are involved, thereby creating a combined prediction model, and wherein
      the combined prediction model uses the dependence value identified in the first prediction model as a weighing value for each predicted data value from each second prediction model, and
      the combined prediction model generates a combined predicted data value corresponding to the financial instrument.

2. The method according to claim 1, further comprising:
   computing, by the computer, a predictive error from the predicted data values of the each of the second prediction models and the combined prediction model, the predictive error computed using a second random selection of received data values to test each of the second prediction models and the combined prediction model; and
   iterating, by the computer, the extracting step to create a new first common feature, the building step to build a plurality of new second prediction models, and the combining step to combine each of the new second prediction models using the computed predictive error for each of the second prediction models and the combined prediction model, thereby incorporating the predictive error to each of the second prediction models and the combined prediction model for reducing the predictive error and updating the combined predicted data value corresponding to the financial instrument.

3. The method according to claim 2, wherein second random selection of received data values are actual price values for the financial instrument.

4. The method according to claim 1, wherein the extracting step further comprises:
   selecting, by the computer, a third random selection of the received data values, the third random selection of received data values corresponding to all the common features comprised in the received data values; and
   processing, by the computer, the third random selection of received data values using a conditional independence test and at least one first prediction model selected from the group consisting of: a classification and regression tree (CART) model, a multivariate adaptive regression splines (MARS) model, and a random forests model, the processing step identifying influential features from among the received common features and related dependence values for each influential feature.

5. The method according to claim 4, wherein the plurality of second prediction models include the first prediction model.

6. The method according to claim 4, wherein the plurality of second prediction models and the first prediction model are the same prediction models, and wherein each of the first and the second prediction models use different or overlapping random selection of data values from the received data values according to the common features of the received data values.

7. The method according to claim 1, wherein the financial instrument is a stock or a security.

8. The method according to claim 1, wherein the first random selection of received data values are historic price values of the financial instrument.

9. The method according to claim 1, wherein the common features of the received data values include one or more of at least a:
   a) closing price value of the financial instrument for a pre-defined time period;
   b) change in price values of the financial instrument over a pre-defined time period;
   c) highest value of the financial instrument over a pre-defined time period;
   d) spread value of the financial instrument at a pre-defined time period;
   e) volume of the financial instrument traded over a pre-defined time period;
   f) opening price value of the financial instrument for a pre-defined time period; and
   g) sector of the financial instrument, wherein the sector name is assigned a standard industrial classification (SIC) code.

10. The method according to claim 1, wherein the first and the second prediction models include one or more of at least a time series prediction model, a stochastic prediction model, a statistical prediction model, a clustering prediction model, or a general economic prediction model.

11. The method according to claim 10, wherein the time series prediction model is one or more of at least an auto-regressive (AR) prediction model, a moving average (MA) prediction model, an auto-regressive integrated moving average (ARIMA) prediction model, a vector auto-regressive (VAR) prediction model, an auto-regressive conditional heteroskedastic (ARCH) prediction model, a generalized auto-regressive conditional heteroskedastic (GARCH) prediction model, a recurrent artificial neural network (ANN) prediction model, a hybrid time series prediction model, a fractal time series prediction model, an exponential smoothing model, a Kalman filtering model, and a regime switching prediction model; the stochastic and the statistical prediction models are one or more of at least a hidden markov model (HMM), a wavelet prediction model, and a jump diffusion prediction model; the clustering prediction model is one or more of at least a k-nearest neighbor (KNN) prediction model, a support vector model (SVM), an expectation maximization (EM) model, a classification and regression trees (CART) model, and a multivariate adaptive regression splines (MARS) model; and the general economic prediction model is one or more of at least a Bayesian network prediction model and a macroeconomic model.

12. The method according to claim 1, wherein the building step further comprises:
   retrieving, by the computer, the first random selection of the received data values corresponding to the financial instrument;
   separating, by the computer, the first random selection of the received data values according to more than one different time period and according to its common features, where, when the common features overlap for the first random selection of the received data values, the separating step provides replicate data values for each of the separated common features;
   computing, by the computer, the performance of the separated data values across different time periods for each of the plurality of the second prediction models using the separated first random selection of the received data values; and
   selecting, by the computer, from each of the plurality of second prediction models, only those second prediction models that present a threshold correlation between the separated data values across different time periods.

13. The method according to claim 1, wherein the predicted data values and the combined predicted data value are a performance indicator indicating a potential increase or decrease in the price or trade value for the financial instrument.

14. The method according to claim 1, wherein the predicted data value and the combined predicted data value is a performance indicator that represents a count or percentage of correctly classified received data values for each of the prediction models.

15. The method according to claim 1, wherein
   the receiving step, by the computer, further comprises receiving emotional sentiment data corresponding to the financial instrument from computer-based sources on the internet;
   the extracting step, by the computer, further comprises extracting textual information from the emotional sentiment data from computer-based sources on the internet;
   the building step, by the computer, further comprises assigning a numerical score to the financial instrument corresponding to the positive and negative emotional words extracted from the textual information, wherein the numerical score is a product of a numerical value attached to each positive and negative emotional word, and numerical weights associated with performance of the industry associated with the financial instrument; and
   the combination step, by the computer, further comprises weighing each second prediction model in the series arrangement by the numerical score.

16. A system for predicting financial instrument performance, the system comprising:
   a computer for receiving data values corresponding to a financial instrument, the data values comprising a plurality of common features;
   the computer for extracting, using at least a first prediction model, more than one first common feature from the received plurality of common features and a corresponding dependence value for each of the extracted first common features, each of the extracted first common features being an influential feature;
   the computer for building a plurality of second prediction models, each of the second prediction models corresponding to each of the extracted influential features and each of the second prediction models using a first random selection of the received data values corresponding to each of the extracted influential features to generate predicted data values corresponding to the financial instrument for each extracted influential feature; and
   the computer for combining each of the second prediction models in a series arrangement, wherein the predicted data values corresponding to one second prediction model is input to another second prediction model until all the second prediction models are involved, thereby creating a combined prediction model, and wherein
   the combined prediction model uses the dependence value identified in the first prediction model as a weighing value for each predicted data value from each second prediction model, and the combined prediction model generates a combined predicted data value corresponding to the financial instrument.

17. The system according to claim 16, further comprising:
the computer for computing a predictive error from the predicted data values of the each of the second prediction models and the combined prediction model, the predictive error computed using a second random selection of received data values to test each of the second prediction models and the combined prediction model; and the computer for iterating the extracting part of the system to create a new first common feature, the building part of the system to build a plurality of new second prediction models, and the combining part of the system to combine each of the new second prediction models using the computed predictive error for each of the second prediction models and the combined prediction model thereby incorporating the predictive error to each of the second prediction models and the combined prediction model for reducing the predictive error and updating the combined predicted data value corresponding to the financial instrument.

18. The system according to claim 16, wherein the extracting part of the system further comprises:
the computer for selecting a third random selection of the received data values, the third random selection of received data values corresponding to all the common features comprised in the received data values; and the computer for processing the third random selection of received data values using a conditional independence test and at least one first prediction model comprising a classification and regression tree (CART) model, a multivariate adaptive regression splines (MARS) model, or a random forests model, wherein processing the third random selection of received data values identifies influential features from among the received common features and related dependence values for each influential feature.

19. The system according to claim 18, wherein the plurality of second prediction models include the first prediction model.

20. The system according to claim 18, wherein the plurality of second prediction models and the first prediction model are the same prediction models, and wherein each of the first and the second prediction models use different or overlapping random selection of data values from the received data values according to the common features of the received data values.

21. The system according to claim 16, wherein the financial instrument is a stock or a security.

22. The system according to claim 16, wherein the first random selection of received data values are historic price values of the financial instrument.

23. The system according to claim 16, wherein second random selection of received data values are actual price values for the financial instrument.

24. The system according to claim 16, wherein the common features of the received data values include one or more of at least a:
a) closing price value of the financial instrument for a pre-defined time period;
b) change in price values of the financial instrument over a pre-defined time period;
c) highest value of the financial instrument over a pre-defined time period;
d) spread value of the financial instrument at a pre-defined time period;
e) volume of the financial instrument traded over a pre-defined time period;
f) opening price value of the financial instrument for a pre-defined time period; and
g) sector of the financial instrument, wherein the sector name is assigned a standard industrial classification (SIC) code.

25. The system according to claim 16, wherein the first and the second prediction models include one or more of at least a time series prediction model, a stochastic prediction model, a statistical prediction model, a clustering prediction model, or a general economic prediction model.

26. The system according to claim 25, wherein the time series prediction model is one or more of at least an auto-regressive (AR) prediction model, a moving average (MA) prediction model, an auto-regressive integrated moving average (ARIMA) prediction model, a vector auto-regressive (VAR) prediction model, an auto-regressive conditional heteroskedastic (ARCH) prediction model, a generalized auto-regressive conditional heteroskedastic (GARCH) prediction model, a recurrent artificial neural network (ANN) prediction model, a hybrid time series prediction model, a fractal time series prediction model, an exponential smoothing model, a Kalman filtering model, and a regime switching prediction model; the stochastic and the statistical prediction models are one or more of at least a hidden markov model (HMM), a wavelet prediction model, and a jump diffusion prediction model; the clustering prediction model is one or more of at least a k-nearest neighbor (KNN) prediction model, a support vector model (SVM), an expectation maximization (EM) model, a classification and regression trees (CART) model, and a multivariate adaptive regression splines (MARS) model; and the general economic prediction model is one or more of at least a Bayesian network prediction model and a macroeconomic model.

27. The system according to claim 16, wherein the building part of the system further comprises:
the computer for retrieving the first random selection of the received data values corresponding to the financial instrument;

the computer for separating the first random selection of the received data values according to more than one different time period and according to its common features, where, when the common features overlap for the first random selection of the received data values, the separating part of the system provides replicate data values for each of the separated common features;

the computer for computing the performance of the separated data values across different time periods for each of the plurality of the second prediction models using the separated first random selection of the received data values; and the computer for selecting, from each of the plurality of second prediction models, only those second prediction models that present a threshold correlation between the separated data values across different time periods.

28. The system according to claim 16, wherein the predicted data values and the combined predicted data value are a performance indicator indicating a potential increase or decrease in the price or trade value for the financial instrument.

29. The system according to claim 16, wherein the predicted data value and the combined predicted data value is a perfomiance indicator that represents a count or percentage of correctly classified received data values for each of the prediction models.

30. The system according to claim 16, wherein the computer for receiving, receives emotional sentiment data corresponding to the financial instrument from computer-based sources on the internet;

the computer for extracting, extracts textual information from the emotional sentiment data from computer-based sources on the internet;

the computer for building, assigns a numerical score to the financial instrument corresponding to the positive and negative emotional words extracted from the textual information, wherein the numerical score is a product of a numerical value attached to each positive and negative emotional word, and numerical weights associated with performance of the industry associated with the financial instrument; and the computer for combining, weighs each second prediction model in the series arrangement by the numerical score.

\* \* \* \* \*